(12) United States Patent
Allen

(10) Patent No.: US 6,401,674 B2
(45) Date of Patent: Jun. 11, 2002

(54) MULTI-FUEL ENGINE

(75) Inventor: Andy Allen, Beaufort, SC (US)

(73) Assignee: XRDi, Beaufort, SC (US)

( * ) Notice: Subject to any disclaimer, the term of this patent is extended or adjusted under 35 U.S.C. 154(b) by 0 days.

(21) Appl. No.: 09/908,538

(22) Filed: Jul. 20, 2001

Related U.S. Application Data

(63) Continuation of application No. 09/304,017, filed on May 3, 1999.
(60) Provisional application No. 60/084,040, filed on May 4, 1998.

(51) Int. Cl.$^7$ ................................................. F02B 33/04
(52) U.S. Cl. ..................... 123/73 c; 123/305; 123/257; 123/531
(58) Field of Search ........................ 123/73 C, 73 CC, 123/65 B, 531, 533, 590, 257, 260, 266, 143 R, 143 B, 145 A

(56) References Cited

U.S. PATENT DOCUMENTS

| | | | |
|---|---|---|---|
| 3,893,434 A | 7/1975 | Thatcher et al. ......... | 123/119 R |
| 3,893,436 A | 7/1975 | Beekhuis, Jr. .......... | 123/119 R |
| 3,943,904 A | 3/1976 | Byrne | |
| 4,100,896 A | 7/1978 | Thatcher et al. | |
| 4,140,090 A | 2/1979 | Lindberg ................. | 123/75 B |
| 4,211,199 A | 7/1980 | Thatcher et al. ............ | 123/590 |
| 4,290,405 A | 9/1981 | Tipton ........................ | 123/590 |
| 4,358,663 A | 11/1982 | Sperner et al. ......... | 123/145 A |
| 4,359,977 A | 11/1982 | Sperner et al. ......... | 123/145 A |
| 4,674,286 A | 6/1987 | Thatcher et al. .............. | 60/740 |
| 4,761,958 A | 8/1988 | Hellat | |
| 4,977,873 A | 12/1990 | Cherry et al. ................ | 123/267 |
| 5,109,817 A | 5/1992 | Cherry ......................... | 123/272 |
| 5,271,372 A | 12/1993 | Nuti ............................. | 123/533 |
| 5,297,518 A | 3/1994 | Cherry ........................ | 123/260 |
| 5,421,299 A | 6/1995 | Cherry ........................ | 123/260 |
| 5,462,024 A | 10/1995 | Nuti ....................... | 123/179.14 |
| 5,477,835 A | 12/1995 | Nuti ............................. | 123/509 |
| 5,537,979 A | 7/1996 | Nuti ............................. | 123/438 |
| 5,615,644 A | 4/1997 | Nuti ....................... | 123/65 VB |
| 5,632,253 A | 5/1997 | Paul et al. ................... | 123/531 |
| 5,694,905 A | 12/1997 | Nuti ............................. | 123/533 |

OTHER PUBLICATIONS

PCT International Search Report—International Application No.: PCT/US99/09691; Filing Date: 03 May 3, 1999.

*Primary Examiner*—John Kwon
(74) *Attorney, Agent, or Firm*—Crowell & Moring LLP

(57) ABSTRACT

An engine capable of use with multiple different types of fuels including gasoline and alcohol based flues and heavy fuels such as diesel fuel, JP5, JP8, Jet A and kerosene based fuels. The engine includes a main cylinder having a compression chamber at one end and a piston that is movable along the length of the cylinder and which connects to a crankshaft for the engine. A fuel delivery system delivers a combustible mixture of fuel and air through a fuel delivery valve into the combustion chamber at a sonic velocity of flow such that the fuel is substantially atomized into the air of the combustible mixture delivered to the combustion chamber. The combustible mixture is ignited by an igniter within the combustion chamber to urge the piston along the cylinder for driving the crankshaft of the engine.

32 Claims, 13 Drawing Sheets

MULTI-FUEL ENGINE

REFERENCE TO RELATED APPLICATION

This application is a continuation of application Ser. No. 09/304,017 filed May 3, 1999.

This application claims priority to U.S. Provisional Patent Application Serial Number 60/084,040 filed May 4, 1998.

TECHNICAL FIELD

The present invention generally relates to internal combustion engines. In particular, the present invention relates to light weight internal combustion engines which can be run on multiple different types of fuels including gasoline and alcohol based fuels and heavy fuels such as diesel fuel, JP5, JP8, Jet-A and kerosene based fuels.

BACKGROUND OF THE INVENTION

Internal combustion engines are run on a variety of different types of fuels including gasoline, alcohol based fuels and heavy fuels such as diesel fuel, JP5, JP8, Jet-A and kerosene. Typically, gasoline powered or fueled engines operate at compression ratios of approximately 10 to 1 to as low as 5 to 1 whereas diesel and other heavy fuel engines generally require much higher compression ratios, typically on the order of 17 or 20 to 1. This difference in compression ratios is due to the different types of ignition systems used for gasoline engines versus heavy fuel engines.

For example, gasoline, which has a relatively low boiling point of approximately 135° F. at sea level, readily forms vapors in air at atmospheric pressure, such that gasoline fueled engines typically can be spark ignited and operate with a stoichiometric air-fuel ratio. Heavy fuels, by contrast, have higher boiling points, i.e., approximately 350° F. at sea level for diesel fuel, and therefore heavy fuels such as diesel fuel do not readily form such vapors under ambient conditions, making ignition of heavy fuels with spark ignition systems difficult. Thus, heavy fuels generally are used in compression ignition engines in which the fuels are injected under very-high pressures or compression loads to generate sufficiently high heats of compression in the engine cylinder to raise the temperature of the air in the engine cylinder above the ignition point of the heavy fuel. The fuel is then vaporized and burned in the heated air in the cylinder to drive the engine. The HIGH boiling point of heavy fuels makes them less volatile so that these fuels do not readily form vapors at ambient temperatures, making such fuels impractical for use in typical spark ignition engines. For example fuels like kerosene are sometimes used in spark ignition engines, but only after the engine is started with gasoline and operated to raise the engine temperature to a point where vaporization of the kerosene fuel can occur.

The high compression loads resulting from the combustion of heavy fuels also places significant strain on the engine components, requiring such engine components to be formed from thicker, heavier materials to withstand these high compression loads. Since gasoline does not require high compression ratios, with their resultant high compression loads, gasoline engines typically can be lighter, smaller and more portable than heavy fuel engines that produce comparable horsepower but which require significantly heavier, larger engine components in order to be able to withstand the high compression ratios generally required to ignite heavy fuels.

As a result, most heavy fuel powered applications are limited to large, heavy compression engines such as are found in large vehicles such as trucks. Gasoline engines, which can be smaller and lighter in weight, generally are used for smaller applications such as generators and fans or blowers or similar applications for ease of portability and use. For example, the military uses a number of different types of small, light weight gasoline powered engines for use as generators, fans and blowers, pumps, including pumps for fire suppression systems, and other applications such as M17 portable decontamination units for use in the field. Heretofore, diesel or other heavy fuel powered engines have been impractical for use in such applications in the field where portability and ease of storage are necessary, due to the larger sizes and significant weight of such heavy fuel engines.

The problem with gasoline powered engines is, however, that the ability of gasoline to readily form vapors in ambient air at low atmospheric pressure, which enables easy ignition, makes gasoline extremely volatile and dangerous to handle and use as a stray spark and even excessive heat can ignite the gasoline vapors. In addition, in many applications in fields such as construction or military operations, diesel fuel or other heavy fuels are readily available and are used for vehicles such as heavy trucks, bulldozers and the like, whereas gasoline must be brought to the site in containers and stored as a hazardous material.

For example, on Navy ships the engines and most heavy pump or turbine systems are driven using diesel fuel and typically the only use for gasoline on these ships is for the pumps for fire suppression systems, which are required to be light weight and small in size so that they can readily be carried through doors and to various locations throughout the ship. The gasoline is, however, among the most dangerous and volatile materials on the ship. In addition, the military has indicated a desire to standardize the fuel used for all applications, with its preference to being a use of lower cost, safer to handle and use heavy fuel such as JP8 or diesel and to avoid the use of different types of fuels for different applications, especially the use of gasoline due to its volatility and handling requirements for use in the field. It is still necessary, however, for the engines for applications such as pumps and decontamination units to be light weight and easily portable.

Attempts further have been made to develop igniters that can generate sufficiently high heats of combustion sufficient to ignite heavy fuels without requiring the high compression ratios and compression loads typically generated in conventional heavy fuel engines. For example, U.S. Pat. Nos. 4,977,873, 5,109,817, 5,297,518 and 5,421,299 disclose catalytic igniters having a catalyst material wound about an igniter rod which generally is heated to typically around 1200° C. The problem with such igniters has been reliability as the igniter rods are subjected to vibration during engine operation and as current is passed through the catalyst wire wound thereabout, which has caused the rods to crack or break, causing failure of the igniter. In addition, it still has been necessary to significantly compress the diesel fuels to try to form vapors that can be readily ignited by the igniter.

Accordingly, it can be seen that a need exists for a low cost internal combustion engine capable of being operated using multiple different types of fuels including less volatile heavy fuels such as JP5, JP8, Jet A, diesel fuel and kerosene based fuels, which is able to ignite such heavy fuels at reduced compression ratios so as to enable the engine to be constructed of lighter weight components and be easily portable without a significant loss of power output by the engine.

SUMMARY OF THE INVENTION

Briefly described, the present invention comprises a multi-fuel engine for use with a variety of different types of fuels including gasoline and alcohol based fuels and heavy fuels including diesel fuel, JP5, JP8, Jet-A and kerosene, at relatively low compression ratios. As a result, the multi-fuel engine of the present invention can be built using smaller, lighter components for ease of portability and is useable with a variety of different types of fuels without a significant reduction in power output by the engine.

Typically, the multi-fuel engine of the present invention includes an engine block having a series of one of more cylinders and an engine air inlet and engine exhaust, a manifold or cylinder head mounted over the engine block, and a crankcase mounted to the lower end of the engine block. A crankshaft is extended through the crankcase, with the crankshaft being driven by the engine and being connected to an application such as a pump or drive.

In a first embodiment of the present invention, the engine block includes at least one cylinder defining a cylinder chamber having open upper and lower ends and which communicates with the engine air inlet and engine exhaust. A piston is received within and moves along the length of the cylinder chamber. The piston includes a piston body having a head portion and a skirt portion. A connecting rod connects to the body of the piston to the crankshaft such that as the piston is moved along the cylinder chamber, the reciprocating movement of the connecting rod with the piston drives the crankshaft of the engine.

The manifold or cylinder head is mounted over the engine block and defines a combustion chamber that is open to and communicates with the cylinder chamber of the engine block. The combustion chamber generally includes an upper, domed or semi-spherical portion and an open lower end that enables the passage of gases to the cylinder chamber. During operation of the engine, a combustible mixture of fuel and air is ignited within the combustion chamber, causing the piston to be driven along the cylinder of the engine.

A fuel delivery system is mounted to the manifold and includes a fuel metering device, for drawing in and mixing fuel and air for forming a combustible mixture of fuel and air that is ignited in the combustion chamber. The combustible mixture is drawn from the fuel metering device by a compression cylinder assembly and is compressed and directed through a fuel delivery valve. The compression cylinder assembly includes a cylinder chamber into which the combustible mixture is drawn, an auxiliary piston having a head portion, a skirt portion, and a connecting rod connected to an auxiliary crankshaft that is driven off of the rotation of the main crankshaft of the engine for driving the auxiliary piston. As the piston is moved along the cylinder chamber, the combustible mixture is compressed within the compression cylinder and is directed through the fuel delivery valve at a substantially sonic rate of flow and at a valve cracking or opening pressure sufficient to open the fuel delivery valve.

The fuel delivery valve is mounted within the manifold between the compression cylinder assembly and the domed upper end of the combustion chamber along a valve passage. The fuel delivery valve includes a valve body having upper and lower ends and defining an open ended channel extending therethrough. A valve member or poppet is received within the channel of the valve body and has an air/fuel passageway extending from an inlet opening in the upper end of the valve member to an intermediate point. The valve member also has an outwardly flaring lower end of the same approximate diameter as the inside diameter of the valve passage of the valve body so as to seal the open lower end of the valve body.

Recesses are formed in the valve body adjacent its upper end, in which a series of spring washers are received. The spring washers bias the valve member upwardly to a closed position, with the number and size of the springs setting the opening or cracking pressure required to open the valve. A retainer washer is received about the upper end of the valve member, above the spring washers, and acts as a stop to limit the size of the valve opening of the valve body. The retainer washer can be varied in size to vary the size of the valve opening created between the lower ends of the valve member and the valve body when the valve member is moved to an open position, to enable greater or lesser amounts of the combustible mixture to pass therethrough.

Typically, the opening pressure of the fuel delivery valve is set at one atmosphere or greater such that to open the fuel delivery valve, the combustible mixture is directed through the air/fuel passageway of the valve at a sonic velocity. As a result, the fuel within the combustible mixture including heavy fuels, is caused to be substantially atomized within the air, increasing the surface area of the fuel that is exposed to the air and enable the fuel to more readily form vapors for ignition.

The ignition system preferably includes a catalytic igniter having an igniter body generally formed from brass or steel with a first, nozzle end and a second, closed end in which a series of igniter ports are formed. An igniter rod generally formed from a dielectric material such as a ceramic material is received within the igniter body and includes a first, positive contact end and a second, negative contact end that is received at the second end of the igniter body within a seat formed at the second end of the igniter body. As a result, both ends of the igniter rod are supported within the igniter body.

A catalyst material such as a platinum wire or a tape having a platinum ink printed thereon is applied along the length of the igniter rod with areas of increased thickness of the catalyst material at each of the ends of the igniter rod. A heating zone is formed from a concentration of the catalyst material at an intermediate point along the igniter rod adjacent the second end. Electrical current is applied along the igniter rod through the catalyst material to the second end of the igniter rod engaged within the seat of the igniter body so that the igniter body acts as a ground. This causes the catalyst material to be heated at the heating zone to between approximately 900 to 1800° C.

A portion of the combustible mixture delivered to the combustion chamber flows into the igniter through the igniter ports and comes into contact with the heating zone of the igniter, resulting in ignition of the combustion mixture. The ignition of the combustible mixture creates an explosion within the combustion chamber, causing the piston to be driven along the length of the cylinder chamber to drive the crankshaft. It also will be understood that conventional spark plugs can be used in place of the catalytic igniter.

An oil injection system is provided between the auxiliary crankcase of the compression cylinder assembly and the air intake for the primary or main cylinder of the engine. The oil injection system includes an oil injection line connected to the auxiliary crankcase and having a check valve and nozzle projecting into the engine air inlet. As the auxiliary piston is driven, oil and air are drawn into the compression cylinder crankcase from an oil pump to lubricate the compression cylinder assembly. This air and oil thereafter is urged along the oil injection line and into the engine air inlet passage, where it is drawn into the main cylinder crankcase with the inlet air for lubricating the main engine assembly.

An additional embodiment of the present invention comprises a three cylinder, two cycle engine having an engine block, crankcase and cylinder head. Each cylinder includes a main cylinder chamber, a stepped cylinder section, and an air intake through which ambient air is be drawn into the crankcase of the engine. A stepped piston is received within each cylinder and includes a head portion, a skirt portion and a step formed at the lower end of the skirt portion.

A stepped passage and an air injection passage are formed through the engine block adjacent each cylinder, extending in to the cylinder head or manifold. A secondary air intake communicates with the stepped passage such that as the stepped piston is moved along the stepped cylinder section, a negative air pressure is created so as to draw air into the stepped passage. Thereafter, as the stepped piston is moved along its upward stroke, the step of the piston urges the air from the stepped passage into and along the air injection passage to a fuel metering mechanism or device for mixing with fuel to form the combustible mixture. It is also possible to open the air injection passage to the crankcase to draw air from the crankcase into the air injection passage.

The fuel metering module and fuel delivery valve also can be mounted in a variety of positions about the combustion chamber and deliver the combustible mixture of fuel and air at a substantially sonic velocity so that the fuel droplets are substantially atomized within the air of the combustible mixture delivered into the combustion chamber and main chamber of each cylinder. A series of one or more igniters generally are mounted at the combustion chambers of the cylinders for igniting the combustible mixture.

Various objects, features and advantages of the present invention will become apparent to those skilled in the art upon reading the following detailed description, when taken in conjunction with the accompanying drawings.

DETAILED DESCRIPTION OF THE PREFERRED EMBODIMENTS

Figure 1:
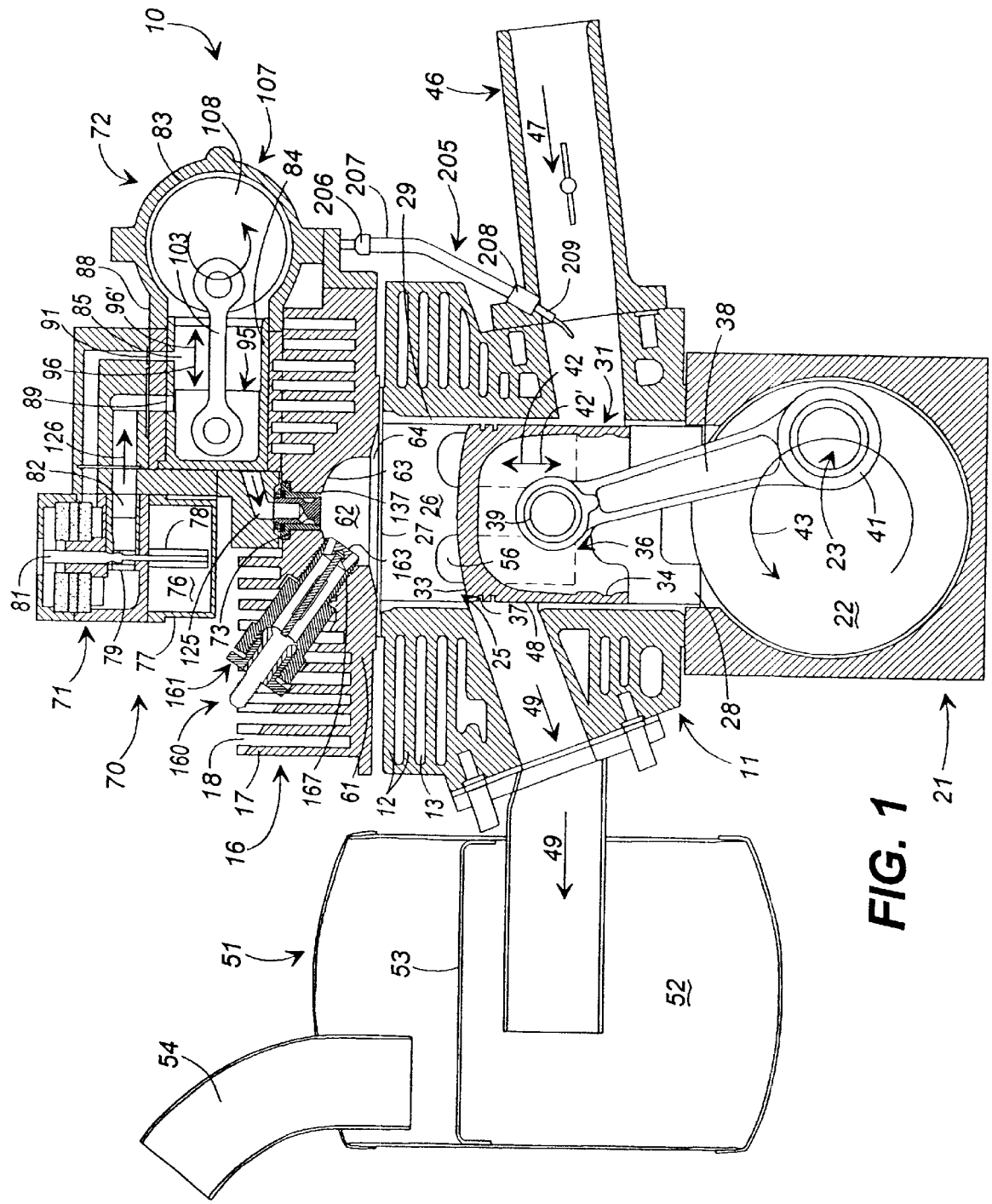
FIG. 1 is a cross sectional end view of a first embodiment of the multi-fuel engine of the present invention.

Referring now in greater detail to the drawings in which like numerals indicate like parts throughout the several views, FIG. 1 illustrates a first embodiment of the multi-fuel engine 10 of the present invention which is designed to be capable of using multiple different types of fuels including gasoline, gasoline and alcohol based fuels, and primarily heavy fuels such as diesel fuel, JP5, JP8, Jet-A and kerosene, without requiring the high compression ratios or loads generally necessary to ignite and burn heavy fuels. As a result, the engine of the present invention can be made of smaller, lighter components for greater portability and case of storage and use, while enabling the use of safer, less volatile and easier to handle heavy fuels without a reduction in power output by the engine.

The multi-fuel engine 10 shown in the first embodiment is a single cylinder engine which includes an engine block 11 generally formed from aluminum or a similar light weight material and having a series of fins 12, with recesses 13 defined between the fins to enable air to pass between the fins, formed in the engine block for heat transfer and cooling of the engine block. A manifold or cylinder head 16, also generally formed from aluminum or similar light weight, durable material, is mounted on top of the engine block 11 and includes a series of fins 17, with recesses 18 defined between the fins for cooling the manifold.

A crankcase 21 is mounted to the lower end of the engine block, as shown in FIG. 1, with the crankcase generally being formed from aluminum and having a cylindrical or tubular chamber 22 that extends along its length. A crankshaft 23 is received within and extends along the crankcase chamber and connects at its distal end (not shown) to a drive mechanism, such as for driving a pump or for transmission of the power generated by the engine to a desired application.

As shown in FIG. 1, the engine block 11 includes an engine cylinder 25 approximately centrally located within the block and defining a main cylinder chamber 26 having an open upper end 27 and an open lower end 28 which communicates with the crankcase chamber 22. A cylinder sleeve 29 is received within and extends along the length of the cylinder chamber, with the cylinder sleeve typically being formed from cast iron or other durable, high strength material.

A main piston 31 is received within and is reciprocably movable along the length of the cylinder chamber 26. The piston includes a piston body, typically formed from aluminum, having a head portion 33 and a skirt portion 34 extending rearwardly from the head portion and defining an open ended cavity 36. The piston body is of approximately the same diameter or width as the cylinder chamber such that the skirt portion of the main piston contacts and slides along the cylinder sleeve. Grooves 37 are formed adjacent the head portion 33 of the piston and receive sealing rings (not shown), that engage and slide against the cylinder sleeve to create a substantially airtight seal between the piston and cylinder sleeve. The main piston 31 further includes a connecting rod 38 generally formed from steel and having a first end 39 received within the cavity 36 and attached to the piston body 32, and a second end 41 that extends into the crankcase 21, as shown in FIG. 1, and connects to an end of the crankshaft 23. As the main piston is moved along the length of the engine cylinder 26, in the direction of arrows 42 and 42, the crankshaft correspondingly is rotated in the direction of arrow 43.

As FIG. 1 illustrates, an engine air inlet 46 is mounted to the engine block 11 along one side thereof and defines an air inlet through the block and into the crankcase chamber 26 for drawing air into the crankcase chamber 26 and crankcase 21 (illustrated by arrow 47) as the piston 31 is moved into its raised position at the top of the cylinder, as illustrated by arrows 42. An engine exhaust 48 is formed through the opposite side of the engine block from the engine air inlet. The engine exhaust defines an air exhaust pathway illustrated by arrows 49 for exhausting of burnt gases and exhaust air from the cylinder as the piston is moved through its downward stroke and returned toward its raised position.

Typically, the engine exhaust is connected to a muffler 51 including a muffler chamber 52 having a perforated inner wall 53 and an outlet 54. The exhaust gases are introduced into the muffler through the exhaust port 48 and pass through the perforated wall and through the outlet, and thereafter can be routed to, for example, a boiler for an M17 decontamination unit. Since the exhaust gases typically retain a significant portion of their heat, this heated air can be used for preheating a fluid and thus conserving the heat and thus reducing the amount energy required to heat the air and water within the boiler.

Transfer ports, shown in dashed lines 56 in FIG. 1, are formed in the cylinder 25 and are connected to the crankcase 21 through transfer passages (not shown). As the piston moves through its downward stroke toward its lowered-position within the cylinder, it compresses the air drawn into the cylinder and crankcase from the engine air inlet and forces the air through the transfer ports. The air routed through the transfer ports scavenges and urges the burnt gases and bi-products of combustion from the cylinder chamber through the exhaust port and into the muffler to clear the cylinder chamber.

Figure 2:
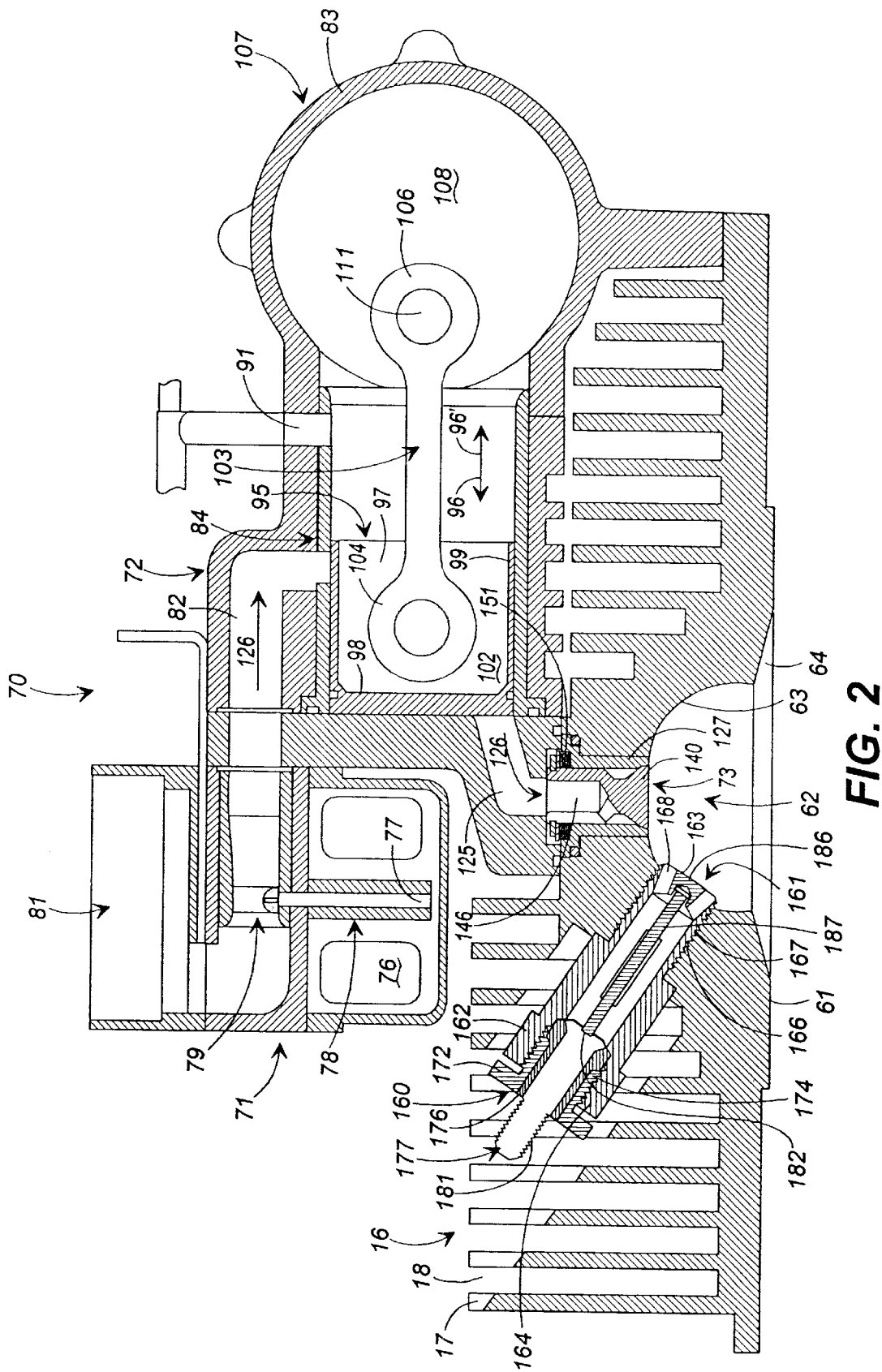
FIG. 2 is a cross sectional end view of the cylinder head of the embodiment of FIG. 1.

As shown in FIGS. 1 and 2, the manifold or cylinder head 16 is mounted on top of the engine block and includes a base 61 projecting from the bottom of the manifold and which is adapted to engage and seat over the open upper end 27 (FIG. 1) of the cylinder 26 with a gasket or sealing ring (not shown) generally positioned between the manifold and engine block, and a top portion 62. A combustion chamber 63 is defined in the base of the manifold and communicates with the open upper end of the cylinder as indicated in FIG. 1. The combustion chamber includes a substantially semi-cylindrical or domed upper portion 64 and an outwardly flared lower portion 66 that is received over the open upper end 27 of the cylinder 25.

A combustible mixture of fuel and air is received and ignited within the combustion chamber resulting in the driving of the main piston in its reciprocating movement along the cylinder in the direction of arrows 42 and 42. As stated above, the fuel used to form the combustible mixture can be of a variety of different types of fuel including gasoline and alcohol based fuels and heavy fuels including diesel fuel, JP5, JP8, Jet-A and kerosene. Preferably, heavy fuels such as diesel fuel and etc. will be used for safety in handling and lower cost.

A fuel delivery system 70 is mounted on the top portion of the manifold for forming the combustible mixture of fuel and air and delivering the combustible mixture through the manifold to the combustion chamber 63. The fuel delivery system of this first embodiment of the present invention generally includes a fuel metering device 71, a compression cylinder assembly 72 and a fuel delivery valve 73.

As shown in FIGS. 1 and 2, the fuel metering device 71 generally is a carburetor, fuel injection system or other type of conventionally known fuel metering device as will be understood by those skilled in the art. The fuel metering device shown generally includes a fuel bowl 76 having inlet ports 77 that communicate with and draw fuel from a fuel supply (not shown). A fuel jet or flow pipe 78 extends upwardly from the fuel bowl into a mixing chamber 79 within the center of the fuel metering device. An air inlet 81 with a filter is positioned at the upper end of the fuel metering device for drawing a flow of air into the fuel metering device and into the mixing chamber 79 where the air is mixed with the fuel to form the combustible mixture. The resultant combustible mixture is drawn along a fuel path 82 from the mixing chamber of the fuel metering device through a housing 83 by the compression cylinder assembly 72.

The housing 83 for the compression cylinder assembly 72 typically is made from aluminum or steel and is mounted to the manifold. The compression cylinder assembly includes a compression cylinder 84 that defines a cylinder chamber 85 having first and second ends 86 and 87. A cylinder sleeve 88 is received within the cylinder chamber 85, extending along the length thereof. A fuel/air inlet port 89 is formed in the compression cylinder and is connected to the fuel path 82 for inflow of the combustible mixture to be drawn along the fuel path 82 into the cylinder chamber. An oil intake 91 also is formed in the compression cylinder 84 and sleeve 88 adjacent the fuel/air inlet port 89. The oil intake communicates with an oil line connected to an oil pump (not shown) and to the air intake 81 for the fuel metering device so that oil and air are mixed together and are drawn into the compression cylinder crankcase through the oil intake port for lubricating the compression cylinder assembly.

As FIG. 2 illustrates, auxiliary or compression piston 95 is slidably received within the compression chamber 85, and is movable therealong in the direction of arrows 96 and 96. The auxiliary piston includes a piston body 97, typically formed from aluminum, having a head portion 98, and a skirt portion 99 defining an open ended cavity 102. A connecting rod 103, generally formed from steel, attaches to the piston body 97 at a first end 104 received within the cavity 102 and has a second end 106 that extends through the second end 87 of the compression cylinder, and into an auxiliary crankcase 107.

Figure 3:
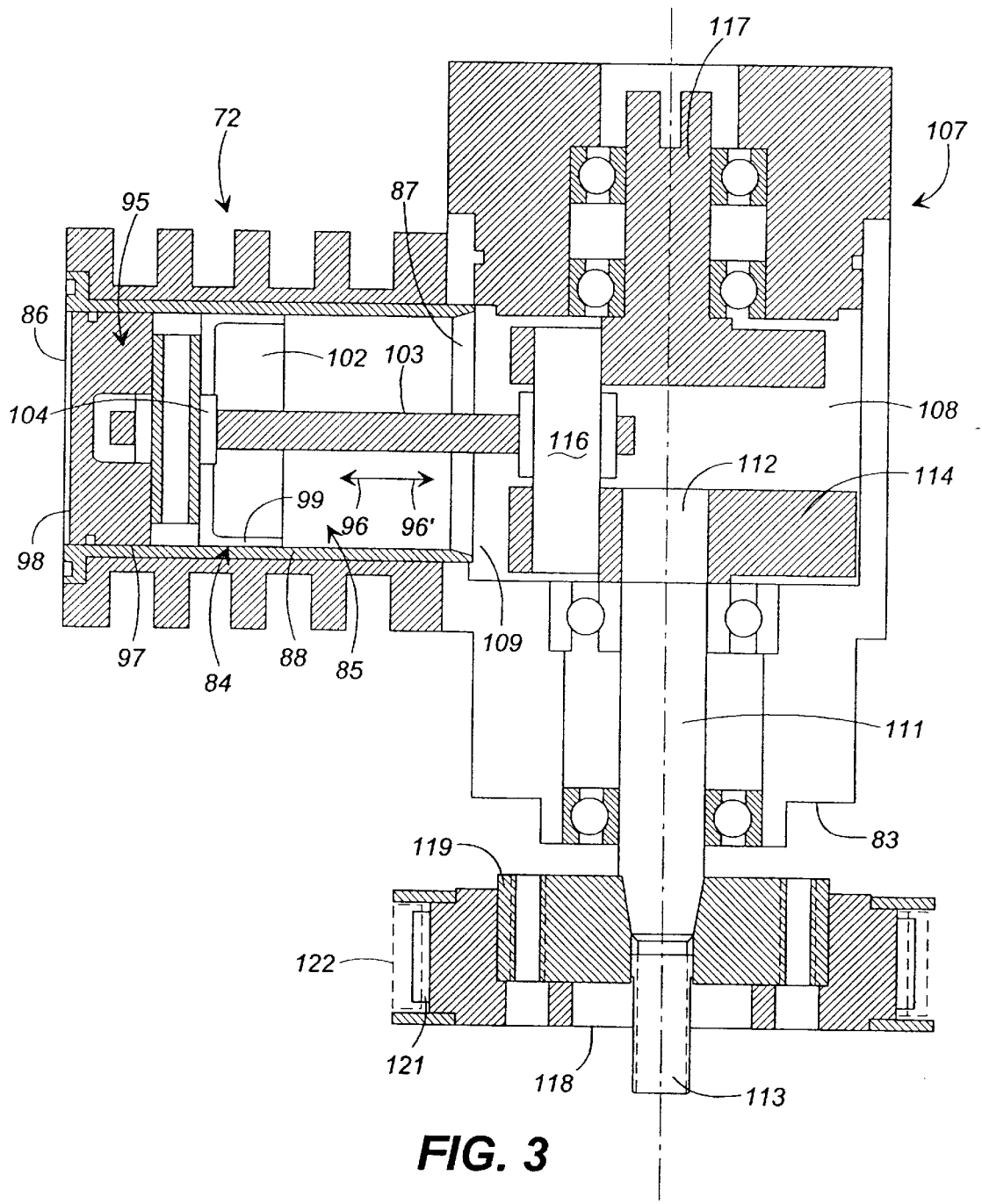
FIG. 3 is a top plan view, taken in cross-section, of the compressor cylinder assembly and auxiliary crankshaft of the embodiment of FIG. 1.

The auxiliary crankcase generally includes a chamber 108 having an opening 109 that opens into and communicates with the chamber 85 of the compression cylinder 84. An auxiliary crankshaft 111 extends through the crankcase as shown in FIG. 3, with the auxiliary crankshaft generally being formed from steel and having a first end 112 and a second end 113 displaced from the crankcase 107. The first end of the crankshaft 112 is connected to the second end 106 of connecting rod 103 by a bushing or connector 114. A crank pin 116 is connected at one end to bushing 114 and extends through the second end of the connecting rod to connect the crankshaft and connecting rod for the piston 95 in an eccentric mounting whereby as the crankshaft is rotated, the piston 95 is pulled or urged along the compression cylinder chamber in the direction of arrows 96 and 96.

The crank pin 116 is attached at its opposite end to a pump drive shaft 117 for the oil pump (not shown) for driving the oil pump to pump oil to the oil intake.

As shown in FIG. 3, a timing pulley 118 is received over the second end of the auxiliary crankshaft 111, mounted thereto with a pulley adapter 119, and includes a series of radially projecting teeth 121. A toothed timing belt or drive belt, shown in dashed lines 122, is received about the timing pulley 118, with the teeth of the timing belt engaging the teeth 121 of the timing pulley. The timing belt extends about the distal end (not shown) of the main crankshaft 23 (FIG. 1) so that as the main crankshaft is rotated, the auxiliary crankshaft 111 likewise is rotated for driving the auxiliary piston and oil pump. The auxiliary crankshaft typically is set at a position 70° to 90° in advance of the main crankshaft and is driven at a 1 to 1 ratio with the rotation of the main crankshaft.

As illustrated in FIGS. 1 and 2, a valve passage 125 is formed in the housing 83 of the compressor cylinder 84, extending from the first end 86 of the cylinder chamber 85 to the fuel delivery valve 73. During operation of the auxiliary piston of the compression cylinder, the combustible mixture is drawn into the chamber 85 of the compression cylinder 84, as indicated by arrows 126, and is compressed with the forward movement of the auxiliary piston 95 in the direction of arrow 96 and is urged into and through the valve passage 125 toward the fuel delivery valve 72. The combustible mixture is compressed to a pressure greater than the opening or cracking pressure of the fuel delivery valve to open the fuel delivery valve and enable the combustible mixture to pass therethrough.

Figure 4A:
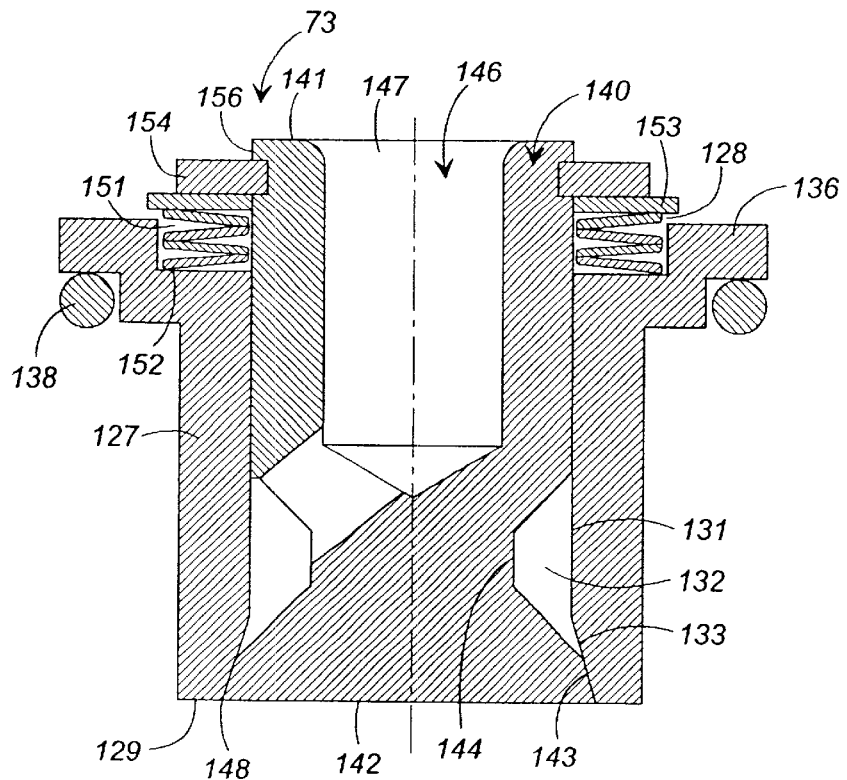
FIGS. 4A and 4B are cross sectional side elevational views illustrating the construction of the fuel delivery valve of the present invention in closed and opened positions.
Figure 4B:
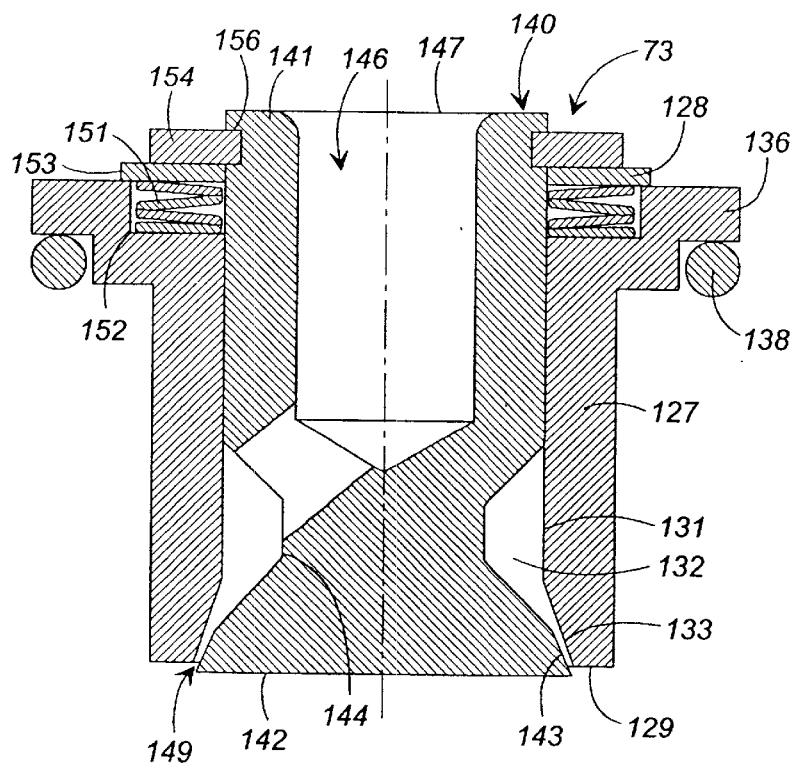

As shown in FIGS. 2 and 4A–4B, the fuel delivery valve 73 includes a valve body 127 generally formed from steel or similar material and has an upper end 128, lower end 129 and a substantially cylindrical side wall 131 defining an open ended channel or passageway 132 approximately through the center of the valve body. As illustrated in FIGS. 4A and 4B, the side wall 131 of the valve body at the lower end 129 includes an outwardly flaring portion 133. An annular ledge or rim 134 is formed about the upper end 128 of the valve body and includes an outwardly projecting step 136 that fits and seals against the manifold with the fuel delivery valve being received within an opening or recess 137 in the manifold and with a gasket or sealing ring 138 being received between the annular step 136 of the valve body and the manifold.

A valve member or poppet 140 is received within and is movable along the channel 132 through the valve body. The valve member generally is formed from steel and includes an upper end 141 that extends slightly above the upper end of the valve body, and a lower end 142 having an outwardly flaring portion 143 that is substantially matched to the outwardly flaring portion 133 formed in the side wall 131 of the valve body. Indentations 144 are formed between the upper and lower portions of the valve member 140 as illustrated in FIGS. 4A and 4B.

An air/fuel passageway 146 is formed in the valve member, extending from an inlet opening 147 formed in the upper end 141 of the valve member, through the valve member and into the channel 132 of the valve body at the indented portions 144 of the valve member. A sealing line 148 is formed between the outwardly flared portion 143 and 133 of the valve member and valve body so as to form a substantially airtight seal therebetween when the valve member is in a closed position as illustrated in FIG. 4A. A valve opening 149 thereafter is formed between the lower ends of the valve member and valve body as the valve member is moved to its open position as illustrated in FIG. 4B to enable the passage of the compressed combustible mixture out of the fuel delivery valve and into the compression chamber.

A series of spring washers 151 are received and stacked within recesses 152 formed in the upper ends of the valve body 127 adjacent the annular rim thereof. Typically, one or more spring washers are used and tend to urge the valve member upwardly toward its closed position. It will be understood by those skilled in the art that various types of springs, such as compression springs or other biasing devices as are conventionally known can be used in place of the spring washers. Further, the size and number of spring washers used depends on the biasing force necessary for setting a desired opening or cracking pressure at which the force of the springs is overcome and the valve member is caused to be moved to its open position to enable passage of the combustible mixture therethrough as shown in FIG. 4B.

Typically, this opening or cracking pressure is set at one atmosphere or greater. To thus open the fuel delivery valve and enable the passage of the combustible mixture therethrough, the combustible mixture must be compressed to an opening pressure of one atmosphere or greater, which causes the combustible mixture to be delivered through the valve to the combustion chamber at a sonic velocity. As a result, the droplets of fuel, including heavy fuels such as diesel fuel, within the combustible mixture of air and fuel are substantially atomized into the air of the combustible mixture. A fine mist thus is created, in which the surface area of the fuel droplets exposed to air is significantly increased, increasing the ability of the fuel to readily formed vapors for enhanced, easier ignition of the fuel without requiring application of high compression loads.

A retainer washer 153 is received about the upper end of the valve member 140 and is secured in place by a snap ring or retaining ring 154 that is received within an indention 156 formed in the upper end of the valve member for holding the retainer washer in place along the valve member. The retainer washer generally acts as an upper stop that engages the upper end of the valve body to limit the travel of the valve member through the valve body and thus limit the size of the valve opening when the valve member is in its open position shown in FIG. 4B. The retainer washer can be selected as having various widths or thicknesses for setting a desired size of the valve opening, for adjusting the amount of combustible mixture delivered into the combustion chamber during a cycle of the engine.

As shown in FIGS. 1 and 2, an ignition system 160 is positioned at the combustion chamber for igniting the combustible mixture. The ignition system 160 preferably includes a catalytic igniter 161, although it may also be possible to use conventional spark plugs or similar spark ignition devices for igniting the combustible mixture. The catalytic igniter 161 is shown in greater detail in FIGS. 2, 5 and 6A.

Figure 5:
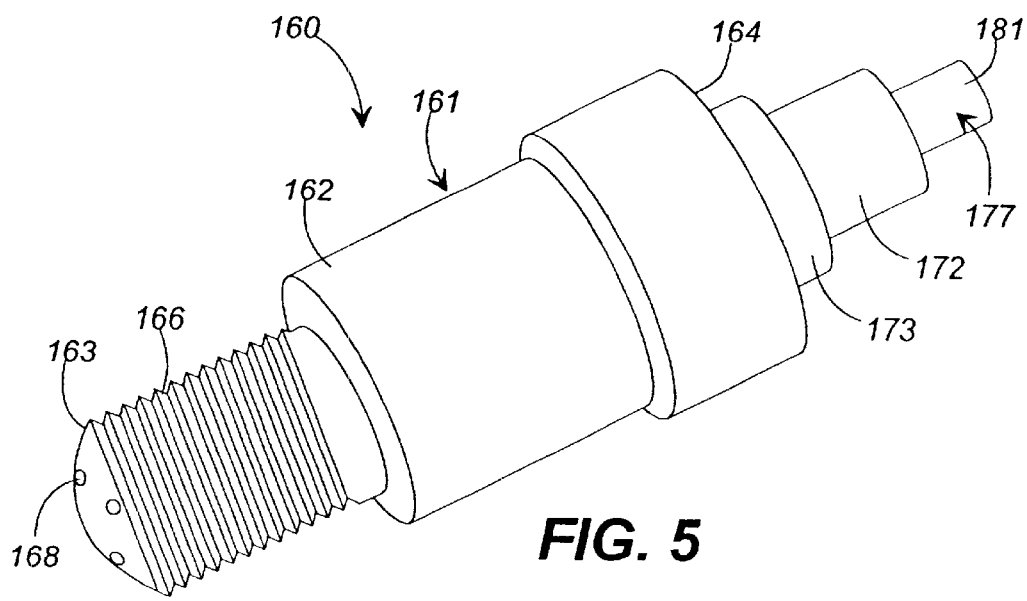
FIG. 5 is a perspective view of a catalytic igniter for use in the multi-fuel engine of the present invention.

The catalytic igniter 161 generally includes an igniter body 162 generally formed from brass or steel and having a nozzle or front end 163 and a rear end or distal end 164. A helical thread 166 is formed about the nozzle end of the igniter to enable the igniter to be threadably received and mounted within a threaded bore 167 (FIG. 2) formed in the manifold, in similar fashion to a conventional spark plug, with the front end of the igniter extending into the combustion chamber as shown in FIG. 2. As FIG. 5 illustrates, a series of nozzle ports 168 are formed in the nozzle. The nozzle ports enable vapors of the combustible mixture to flow into the igniter for ignition of the combustible mixture.

Figure 6A:
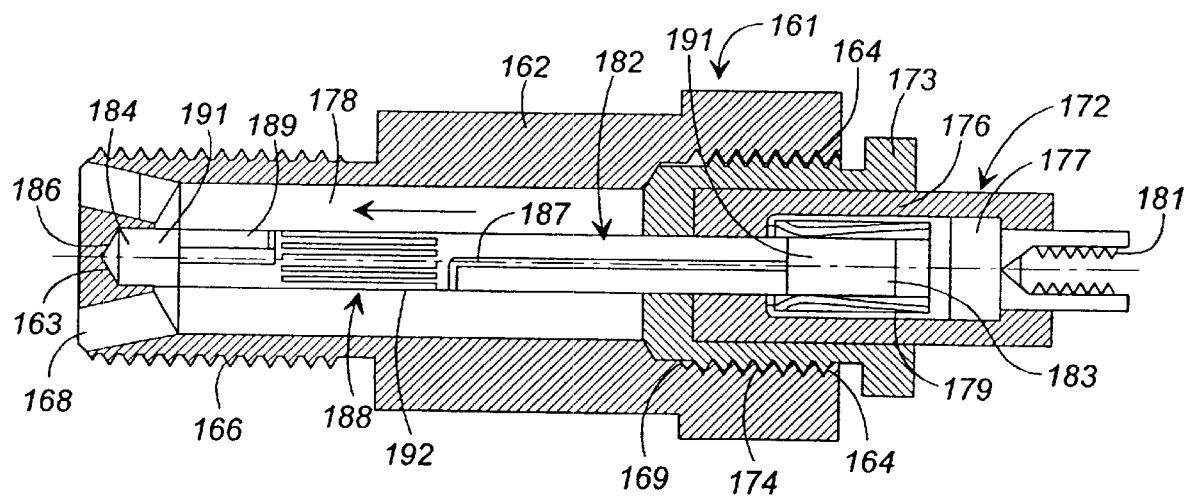
FIG. 6A is a side elevational view taken in cross section of a first embodiment of the catalytic igniter.

As illustrated in FIG. 6A, the catalytic igniter body also includes an internal bore or chamber 169 that extends along the length of the body 162 from the nozzle 163 to the rear end 164. Helical threads 171 are formed about the bore 169 at the end 164 of the igniter body. A rod holder 172 is received within the open end of the body and has a retainer nut 173 with threads 174 that engage the threads 171 of the bore 169 so as to secure the rod holder within the igniter body. The rod holder further includes an insulator sleeve 176, typically formed from a ceramic or similar insulating material. An electrical connector 177 generally formed from an electrically conductive metal material such as steel, brass or copper is embedded within the insulator sleeve 176. The electrical connector includes an open ended cavity or recess 178 in which a series of spring contacts 179 are positioned, and a threaded connector 181 that extends outwardly from the insulator sleeve 176, as shown in FIGS. 5 and 6A, for connecting to an electrical power source such as a 12 volt DC battery or similar power pack (not shown).

An igniter rod 182 is received within the internal bore 169 of the catalytic igniter, extending along the length of the igniter body as shown in FIG. 6A. The igniter rod generally is formed from a ceramic material such as a high purity alumina ceramic or similar material that is able to withstand extreme temperatures of upwards of 1800° C. or greater and typically will be formed as a solid rod, although it also can be formed as a hollow tube. The igniter rod 182 has a first or positive contact end 183 that is received within the cavity or recess 178 of the electrical connector 177, engaged and held by the spring contacts 179, and a second, negative contact end 184. The second, negative contact end of the igniter rod 182 is received within a seat 186 formed within the nozzle end 163 of the igniter body 162 as shown in FIG. 6A. The igniter rod thus is supported from both ends to provide greater stability and strength of the igniter rod and reduce shock and vibration thereto so as to minimize the stress and potential failure of the rod.

Figure 6B:
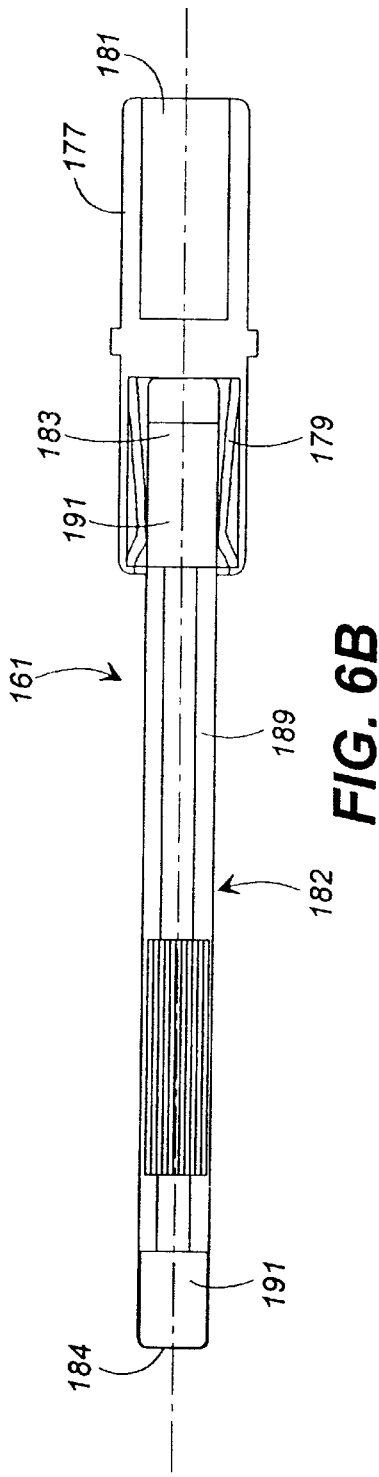
FIG. 6B is a side elevational view of the igniter rod of the catalytic igniter of FIG. 6A.
Figure 6C:
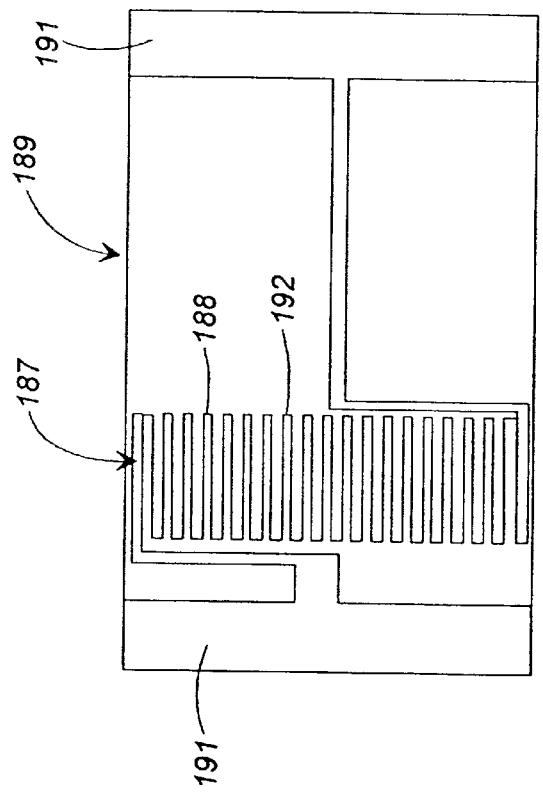
FIG. 6C is a top plan view of the ceramic tape with the catalyst material applied thereon for use with the igniter rod of 6B.

A catalyst material is applied about the igniter rod, as indicated generally at 187. Typically, the catalyst material is platinum metal, although other, similar types of metal catalyst materials capable of absorbing and retaining high levels of heat also can be used. The catalyst material generally is applied in the form of a platinum ink printed in a desired pattern 188, i.e., a serpentine pattern (FIG. 6C), on a ceramic tape 189. The ceramic tape is wrapped about the igniter rod after which the igniter rod and ceramic tape are heated to bond the tape to the igniter rod. As shown in FIGS. 6A and 6B, the catalyst material is concentrated at the first and second ends 183 and 184 of the igniter rod to form electrical contacts 191 at each end of the igniter rod. A heating zone 192 also is formed from a concentration of the catalyst material at an intermediate point along the igniter rod adjacent the second end thereof.

An electrical current, typically 1 to 2.5 amps or greater, is applied to the igniter rod through the electrical connector 177. The current passes along the length of the igniter rod through the catalyst material in the direction of arrow 193 from the first, positive contact end 183 to the second, negative contact end 184 of the igniter rod that is engaged and held within the seat portion 186 of the igniter body. The igniter body therefore acts as the ground contact for the igniter rod so that the current is required to pass in only one direction along the length of the rod.

As the current is passed through the catalyst material at the heating zone 192, the temperature of the catalyst material is raised to between 900 to 1800° C., preferably to between 1100° C. to 1200° C. The temperature of the catalyst material at the heating zone can be varied as necessary to raise the temperature of the catalyst material to a desired temperature above the ignition point of the fuel and air vapors of the combustible mixture. As these vapors come into contact with the heating zone, the vapors are ignited, causing a flare or plume of flame to be directed outwardly through the nozzle ports and into the combustion chamber where the combustible mixture is ignited, causing an explosion that drives the main piston downwardly along the length of the cylinder in the direction of arrow 42.

Figure 7:
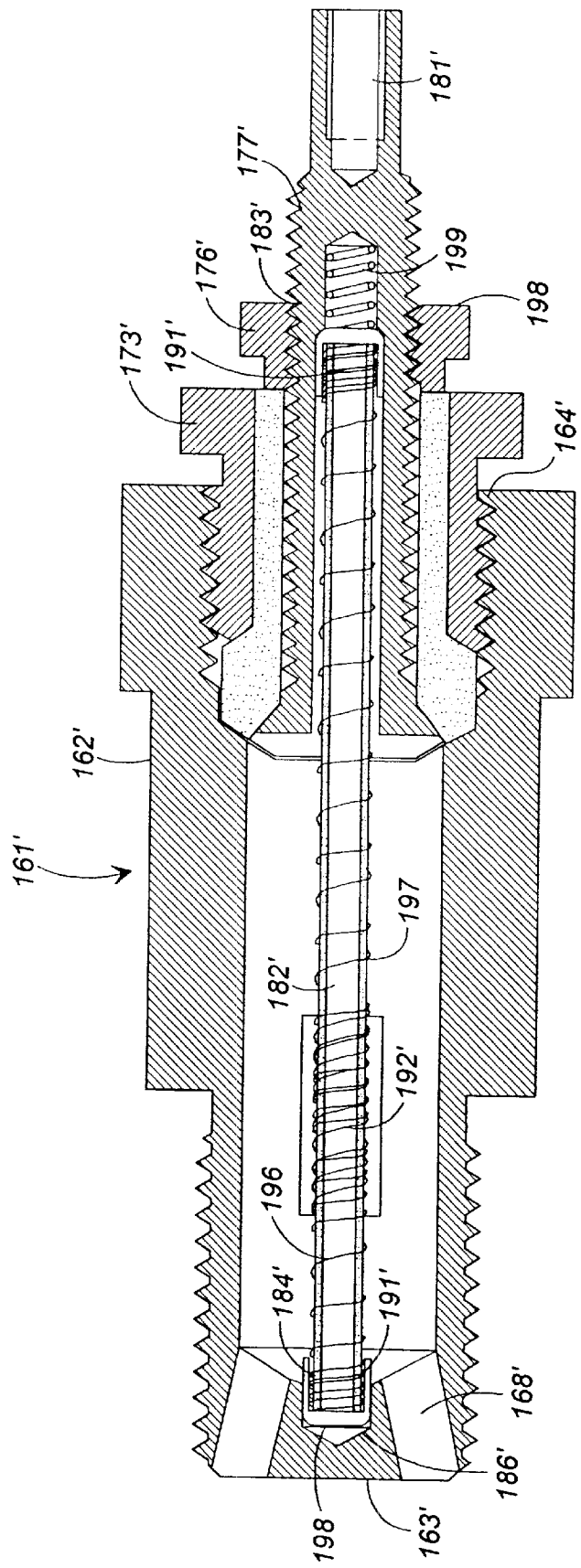
FIG. 7 is a side elevational view taken in partial cross section of a second embodiment of the catalytic igniter of FIG. 5.

A further embodiment of the catalytic igniter 161' for use with the multi-fuel engine of the present invention is shown in FIG. 7. In this embodiment, the catalyst material 196 is illustrated as a platinum wire 197 that is wound about the igniter rod, with the platinum wire being tightly wound about the ends 183' and 184' of the igniter rod and about a heating zone 192' formed along the intermediate portion of the igniter rod. Electrical contacts such as copper caps 198 are applied over the ends of the igniter rod in engagement with the platinum wire for conducting electrical current to the platinum wire 197 at the first end of the igniter rod and thereafter from the platinum wire to the igniter body at the second end of the igniter rod. In addition, a compression spring 199 can be received within the cavity 178' of the electrical connector 177', as shown in FIG. 7, for urging the igniter rod against the seat formed at the nozzle end of the igniter body to ensure that the igniter rod is tightly engaged and supported within the igniter body at both ends.

As shown in FIG. 1, an oil injection line 205 extends from the auxiliary crankcase 107 of the compression cylinder assembly 84 into the engine air inlet 46. The oil injection line includes a fitting 206 which extends downwardly from the crankcase of the compression cylinder assembly, and a conduit 207 connected at one end to the fitting 206 and at its opposite end to a check valve 208 and nozzle 209. The nozzle 209 projects into the engine air inlet as shown in FIG. 1. As the auxiliary piston 95 is moved toward the crankcase, it forces air within the crankcase out of the crankcase and through the oil injection line, carrying with it oil that has been drawn into the compression cylinder and thus into the crankcase from the oil pump. This mixture of oil and air is injected into the intake air being drawn into the main cylinder of the engine through the check valve and nozzle and serves to lubricate the main piston as it slides along the cylinder sleeve.

In operation of the first embodiment of the present invention, fuel and air are drawn into the fuel metering device 71, such as a carburetor, and are mixed to form a combustible mixture of fuel and air. This combustible mixture is drawn along a fuel/air path 82 by negative air pressure generated by the operation of the compression cylinder assembly 72. As the auxiliary piston 95 is moved in the direction of arrow 96' toward the second end 87 of the cylinder chamber 85, the combustible mixture is drawn into the compression cylinder chamber through inlet port 89.

Thereafter, as the auxiliary piston 95 is moved along its return stroke in the direction of arrow 96 toward the first end 86 of the compression cylinder chamber 85, it compresses and urges the combustible mixture and into and along a valve passage 125, causing the combustible mixture to be further compressed. The combustible mixture is compressed to an opening differential or valve cracking pressure sufficient to overcome the biasing spring force of the spring washers 151 of the fuel delivery valve 73 so as to cause the valve member or poppet 140 to be moved downwardly to form the valve opening 149 as shown in FIG. 4B.

Typically, the valve opening or valve cracking pressure is set at one atmosphere or greater depending upon the spring force required to open the valve, as set by the size and number of springs used with the fuel delivery valve. As a result, the combustible mixture is generally delivered into the combustion chamber 62 (FIG. 2) at a sonic velocity or rate of flow. By delivering the combustible mixture into the combustion chamber at a substantially sonic rate of flow, the fuel within the combustible mixture is caused to be atomized into the air of the It combustible mixture and increasing the surface area of the fuel exposed to air so as to create a fine mist of fuel and air within the combustion chamber. This mist of atomized fuel, including heavy fuels, and air readily forms vapors within the combustion chamber which vapors can be easily ignited.

A portion of the mist or vapors of the combustible mixture is drawn into the catalytic igniter 161 through the nozzle ports 168. As the vapors of the combustible mixture come into contact with the heated catalyst material at the heating zone 192, which generally has been heated to approximately 900 to 1800° C. with the passage of electrical current therethrough, the vapors are ignited, causing a flare or plume of flame to erupt through the nozzle ports and into the combustion chamber. This flame ignites the combustible mixture within the compression chamber, with the resulting combustion forcing the main piston 31 downwardly in the direction of arrow 42'. In response, the main crankshaft 21 (FIG. 1) is caused to rotate in the direction of arrow 43, which in turn causes the rotation of the auxiliary crankshaft 111 for driving the auxiliary piston 95 of the compression cylinder assembly 72.

As the main piston is moved downwardly toward the crankcase, it causes air that has been drawn into the main cylinder chamber 26 and crankcase chamber 22 through the engine air inlet to be urged through passages (not shown) and back into the main cylinder chamber through transfer ports 56. This air flow through the transfer ports causes burnt gases and other bi-products of combustion to be scavenged or cleansed from the main cylinder and combustion chamber and directed into and through the engine exhaust 48 as indicated by arrows 49. Thereafter, as the main piston is moved along its return stroke in the direction of arrow 42 toward the upper end of the main cylinder and compression chamber, negative air pressure is created within the lower portion of the main cylinder chamber and crankcase. This negative air pressure causes ambient air to be drawn into the lower portion of the main cylinder chamber and crankcase through the engine air inlet 46 as indicated by arrows 47.

As a result, the multi-fuel engine of the present invention is able to use ambient air for scavenging burnt cases and bi-products of combustion from the engine cylinder without requiring the use of a portion of the combustible mixture to exhaust the burnt gases and other bi-products of combustion, thus conserving fuel without sacrificing performance. In addition, the single cylinder multi-fuel engine of the present embodiment generally weighs only about 35 pounds and is able to produce upwards of approximately 20 horsepower. This engine is smaller, lighter, more portable and has a higher power output than conventional heavy fuel engines used for similar applications such as the military's M17 decontamination units, which can weigh upwards of 150 pounds and only provide approximately 8 horsepower.

Figure 8:
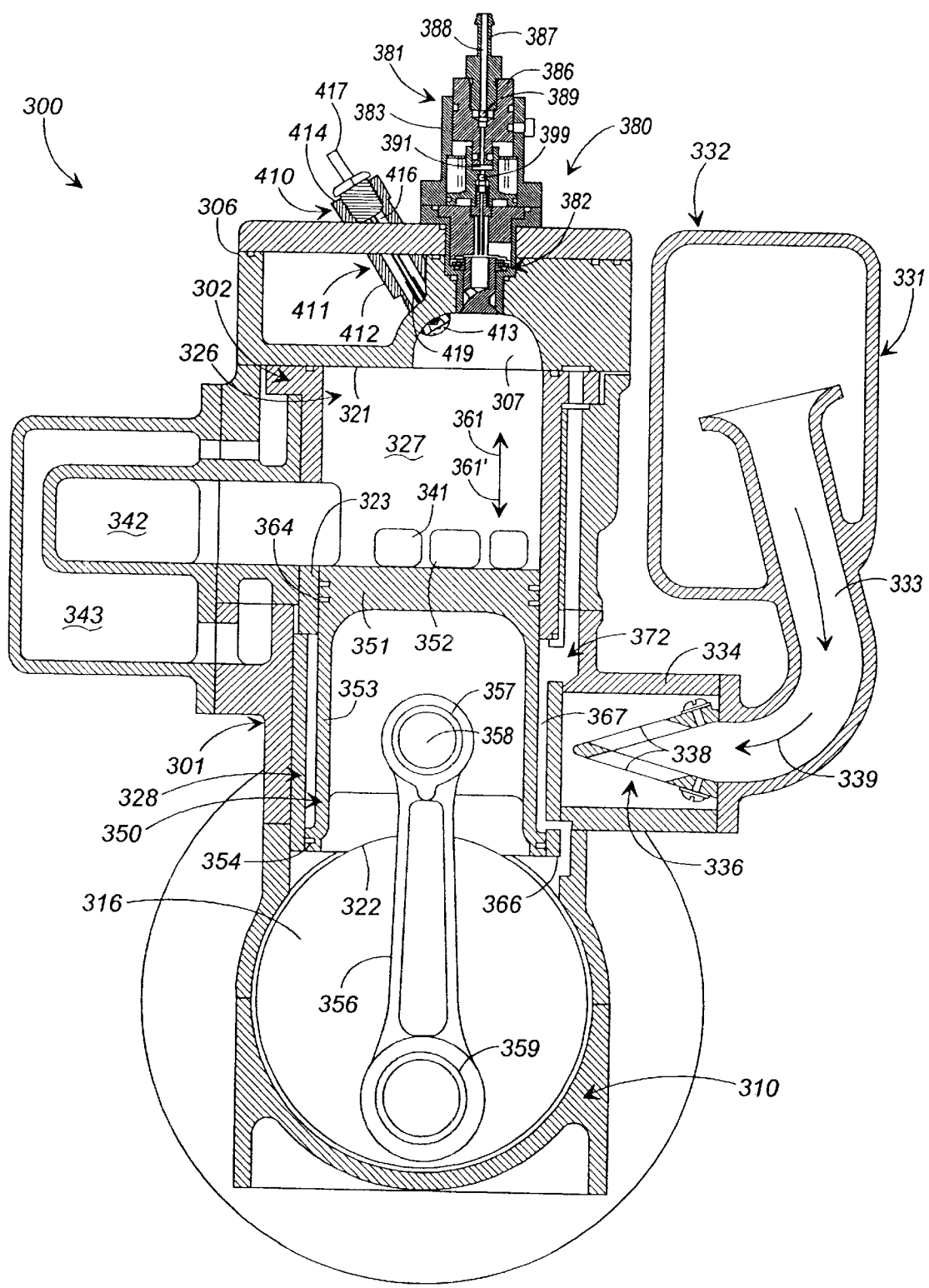
FIG. 8 is a cross sectional end view of a second embodiment of the multi-fuel engine of the present invention.
Figure 9:
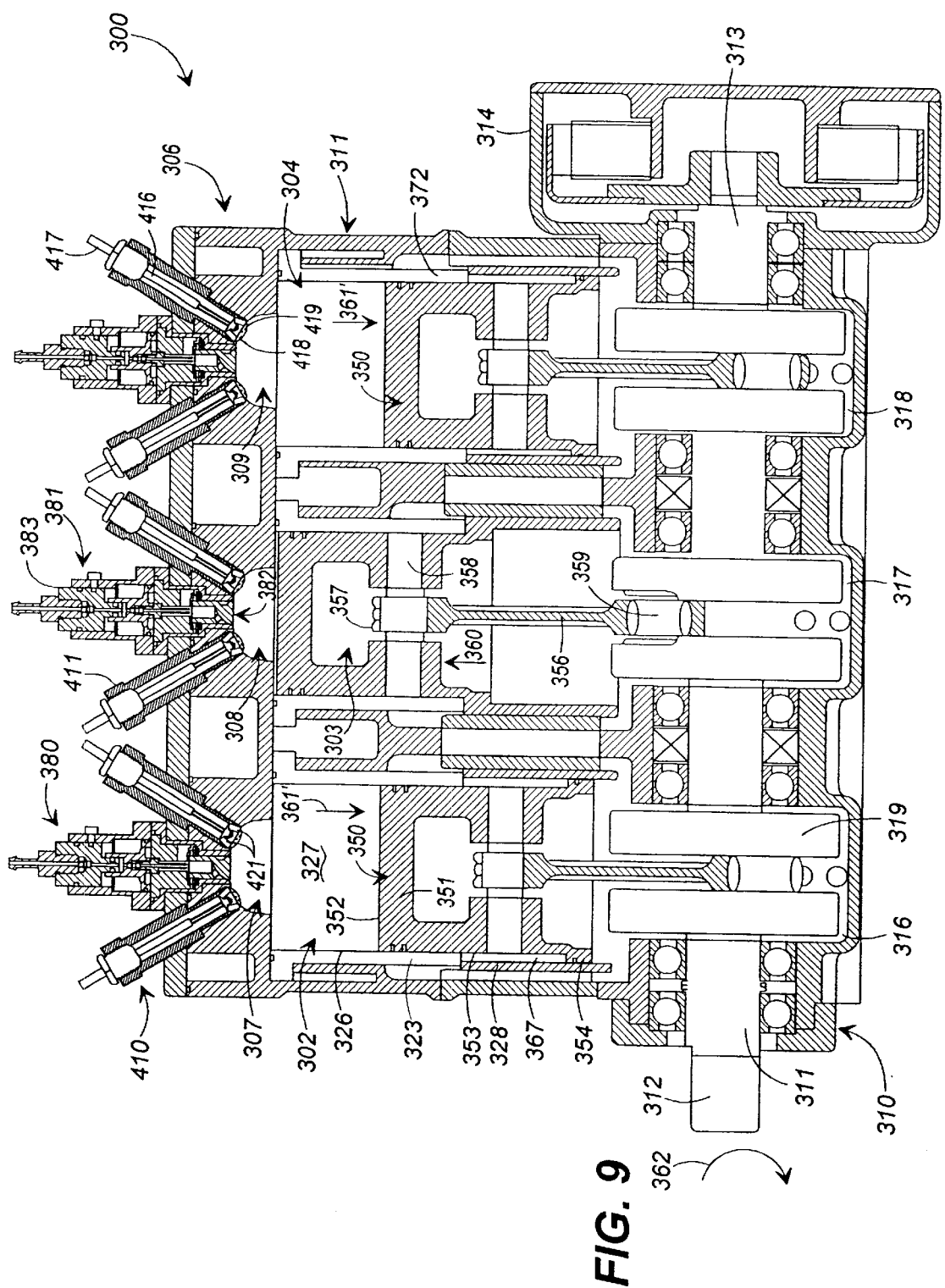
FIG. 9 is a side elevational view taken in cross section of the second embodiment of the multi-fuel engine of the present invention.

An additional embodiment of the multi-fuel engine and components of the present invention is shown in FIGS. 8–12. In this embodiment, the multi-fuel engine 300 includes an engine block 301 typically. formed from aluminum or similar light weight, high strength material and having a series of three cylinders 302–304 defined therein. As illustrated in FIG. 9, a manifold or cylinder head 306, also typically formed from aluminum or similar high strength light weight material is mounted on top of the engine block. a series of combustion chambers 307–309 are defined in this manifold, positioned over and aligned with the cylinders 302–304.

A crankcase 310 is mounted to the lower end of the engine block. A crankshaft 311, generally formed from steel, extends along the length of the crankcase as shown in FIG. 9 and includes a first end 312 that projects outwardly from the crankcase for connection to a drive mechanism such as an impeller or drive belt (not shown), and a second end 313 to which a bell housing connector 314 is mounted for connecting the crankshaft to an alternator and oil pump (not shown) for driving the alternator and oil pump of the engine. A series of cavities 316–318 are formed in the crankcase 310, aligned approximately with the cylinders 302–304 and in which a series of connectors 319 mounted about the crankshaft 311 are positioned.

As illustrated in FIG. 9, each of the cylinders 302–304 includes an upper end 321, and open lower end 322 and has a sleeve 323, typically formed from cast iron, that extends along the length thereof and forms a side wall 324. Each of the cylinders 302–304 includes a main cylinder 326, defining a main cylinder chamber 327 that is open to and communicates with the combustion chamber 307 defined in the cylinder head 306 for each cylinder, and a stepped cylinder section 328.

As FIG. 8 illustrates, an engine air inlet 331 is positioned on one side of the engine block and communicates with the crankcase through air passages (not shown). The engine air inlet includes an inlet plenum and manifold 332 through which ambient air is drawn from the outside environment, and an air hose or tube 333 that extends from the manifold 332 to a check valve 334 mounted to the side of the engine block as illustrated in FIG. 8. The check valve is shown here as a reed valve 336 having a pair of reeds 338 that generally are biased into a closed position until air is drawn through the valve, causing the reeds to move outwardly to open the valve.

As the engine is operated, ambient air is drawn into the manifold and through the valve in the direction of arrows 339 and is passed into the crankcase 310. This inlet air thereafter is routed from the crankcase along passages (not shown) to a series of transfer ports 341 that open into the main cylinder chamber 327. An engine exhaust 342 is formed in the side wall of each cylinder, as shown in FIG. 8, and connects to an exhaust manifold 343 into a muffler and/or boiler, as discussed above. As the ambient air drawn through the air inlet is passed through the transfer ports 341 and into the main cylinder chamber, it scavenges or clears the main cylinder chamber of burnt gases and other bi-products of combustion through the engine exhaust.

As illustrated in FIGS. 8 and 9, each cylinder includes a stepped piston 350 received within and movable along the length of each cylinder. Each stepped piston 350 generally includes a piston body 351 typically formed from aluminum or similar material and having a head 352, and a skirt 353 with a step 354 formed at a lower end of the skirt 353. Each stepped piston further includes a connecting rod 356, generally formed from steel, having a first end 357 received within the piston body 351 and attached thereto with a wrist pin 358 and a second end 359 that projects downwardly and into the crankcase 310, extending into one of the cavities 316–318 thereof as shown in FIG. 9. The second ends 359 of each connecting rod 356 each are attached to a connector 319 mounted about the crankshaft 311 so as to attach the stepped pistons to the crankshaft in an eccentric mounting. As the stepped pistons are moved in the direction of arrows 361 and 361 along the length of each cylinder 302–304, the crankshaft is caused to be rotated as shown by arrow 362. Typically, the pistons are timed in sequence approximately 120° apart for driving the crankshaft.

O-rings or sealing gaskets (not shown) typically formed from rubber or similar sealing material, are received within recesses 364 (FIG. 8) formed in the body of each stepped piston so that a substantially airtight seal is formed between each stepped piston body and the sleeve 323 of each cylinder as the stepped pistons move therealong. As each stepped piston is moved upwardly in the direction of arrow 361, a negative air pressure or vacuum is created within its cylinder 302–304, causing air to be drawn through the engine air inlet 331 in the direction of arrows 339 and into the crankcase. As each stepped piston thereafter moves along its return stroke downwardly in the direction of arrow 361', the air is compressed in the crankcase, causing the check valve of the air inlet to close and seal and prevent air from exiting through the engine air inlet, and causing the ambient air in the crankcase to flow through transfer passages (not shown) and into the main cylinder chamber through the transport ports 341.

Figure 11:
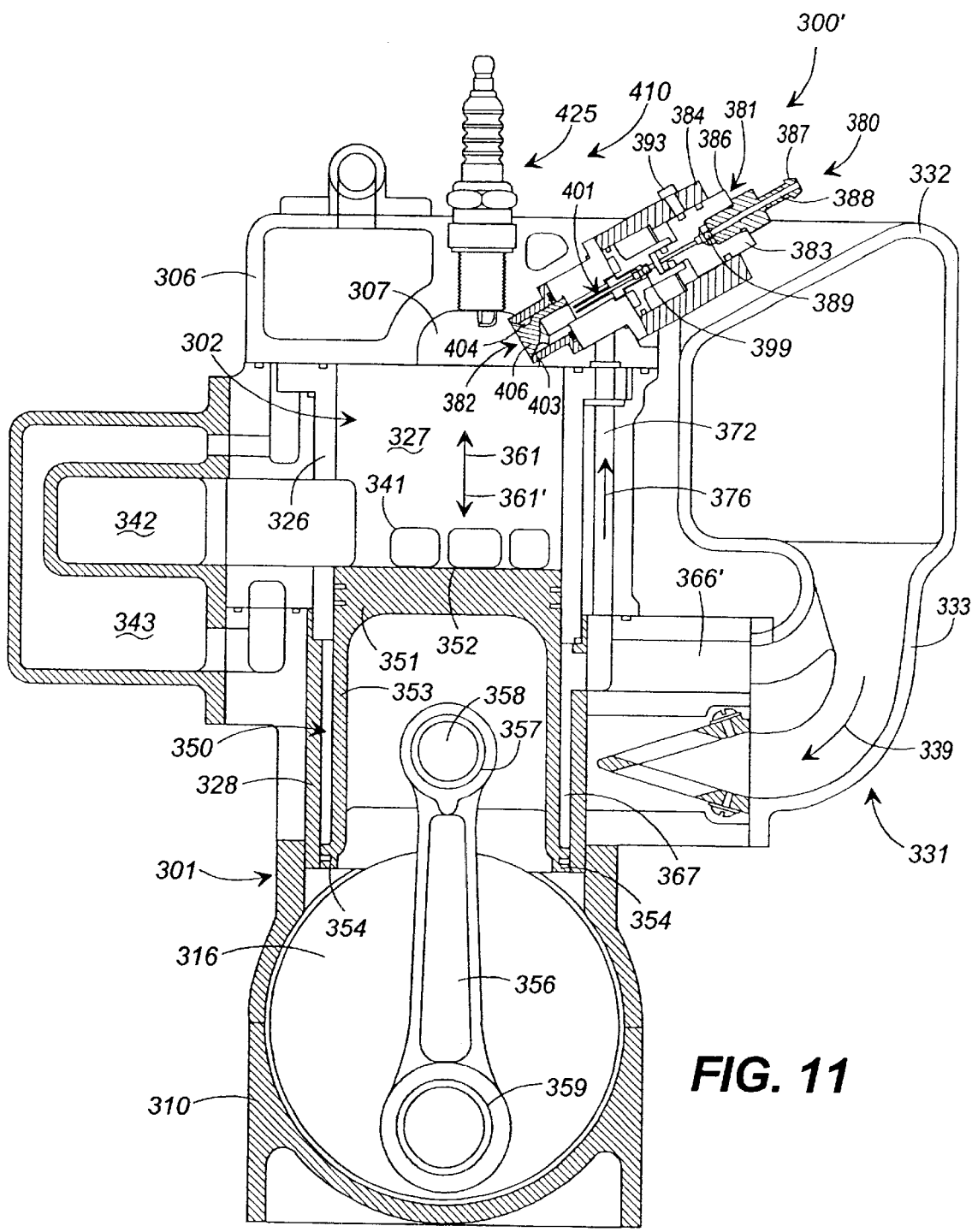
FIG. 11 is a cross sectional end view of the embodiment of the present invention of FIG. 8 illustrating the use of a spark plug and a secondary air intake.
Figure 12:
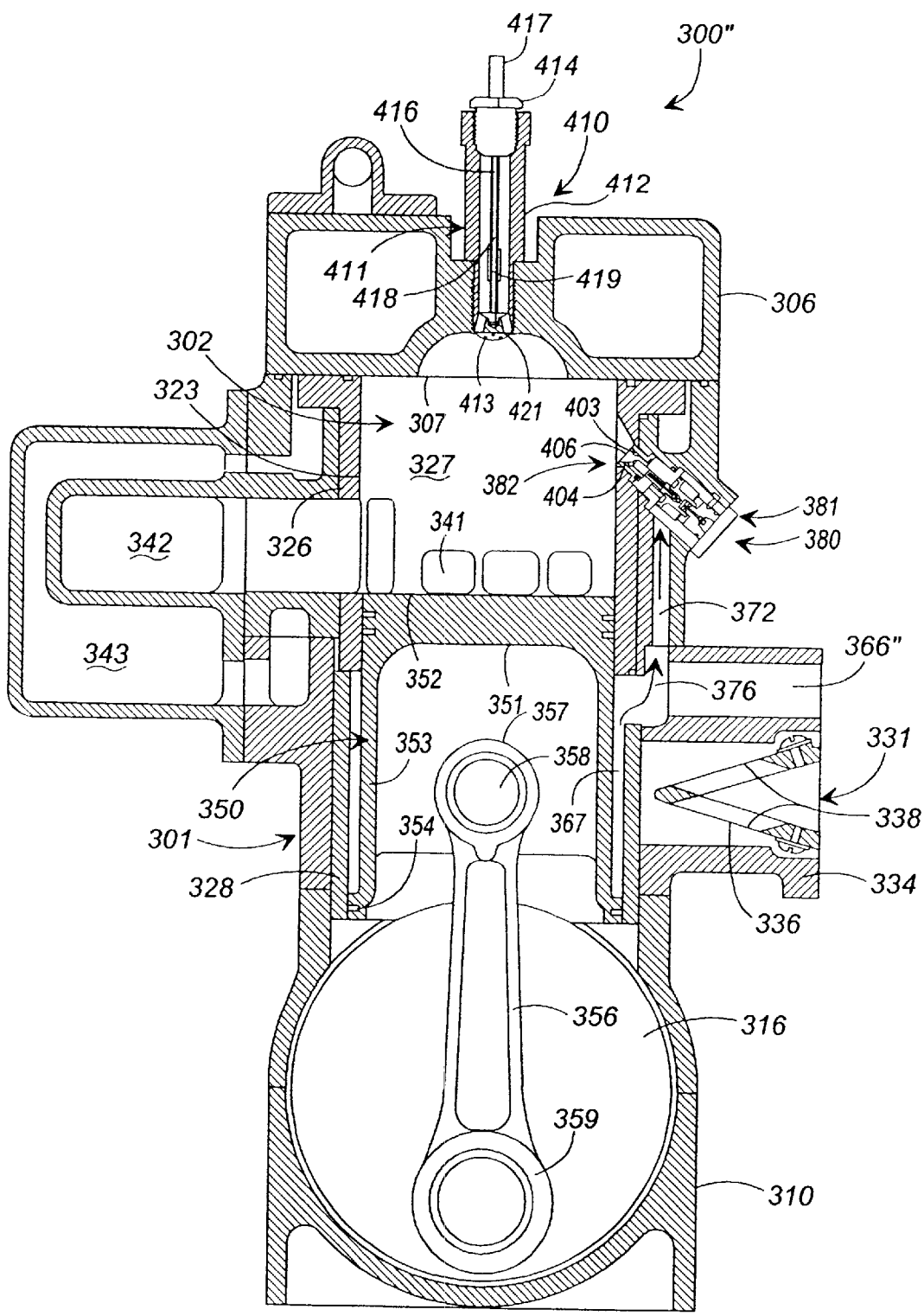
FIG. 12 is a cross sectional end view illustrating the use of the secondary air inlet and varied position of the fuel delivery valve.

As illustrated in FIGS. 8, 11 and 12, a secondary air intake 366 is formed in the engine block 311 and communicates with a stepped passage 367. As shown in FIG. 8, the secondary air intake passage 366 can be formed leading from the crankcase 310 through the side wall of the engine block and into the stepped passage 367. This enables flow of air to be provided into the stepped passage using a portion of the air drawn into the crankcase through the engine air inlet 331. Alternatively, as illustrated in FIGS. 11 and 12, the secondary air intake 366 and 366 can be formed in the side wall of the engine block at the upper end of the stepped passage 367. In such an arrangement, the secondary air intake typically will be connected to the manifold 332 (FIG. 11) of the engine air inlet 331 for drawing a portion of the ambient air being drawn through the engine air inlet through the secondary air intake and into the stepped passage. In addition, a check valve, such as a reed valve, (not shown) typically will be mounted within the secondary air intake of the embodiments shown in FIGS. 11 and 12 to permit the flow of air into and through the secondary air intake into the stepped passage while preventing a backflow of air through the secondary air intake.

As shown in FIGS. 8, 11 and 12, the stepped passage 367 extends upwardly along each cylinder, being defined at its lower end by the step 354 formed in the body 351 of each stepped piston 350 and at its upper end by the sleeve 323 received within each cylinder. The stepped passage 367 opens into and communicates with an air injection passage 372 that extends upwardly through the block to a fuel delivery system 375. As each stepped piston 350 is moved along the length of its cylinder 302–304 (FIG. 9), it causes air to be drawn into the stepped passage, either by compressing and urging the air out of the crankcase as illustrated in FIG. 8, or by drawing air into the secondary air intake through the engine air manifold as indicated in FIG. 11. Thereafter, as each stepped piston is moved along its upward stroke in the direction of arrow 361, the substantially airtight engagement of the step 354 with the side wall of the stepped cylinder section 328 causes the air within the stepped passage to be forced into and along the air injection passage as illustrated by arrows 376 so that the air is delivered or injected into a fuel delivery system 380 mounted to the manifold under pressure for mixing with a supply of fuel to form a combustible mixture of fuel and air.

As discussed above with reference to the first embodiment of the multi-fuel engine of the present invention, the fuel delivery system generally includes a fuel metering device 381 and a fuel delivery valve 382. The fuel metering device can be of various types as conventionally known, including a carburetor as discussed above, or a fuel injection system as indicated generally at 383 in FIG. 10.

The fuel injection system 383 (FIG. 10) generally includes a body or housing 384 in which a fuel piston 386 is received. The fuel piston includes a nozzle 387 that projects upwardly therefrom and connects to a fuel supply (not shown). A fuel passage 388 is defined through the nozzle and fuel piston, along which the fuel received from a fuel pump (not shown) and fuel supply passes. An inlet check valve 389 is positioned along the fuel passage 388 between the nozzle and fuel piston for controlling the inlet flow of fuel through the nozzle and fuel piston.

Figure 10:
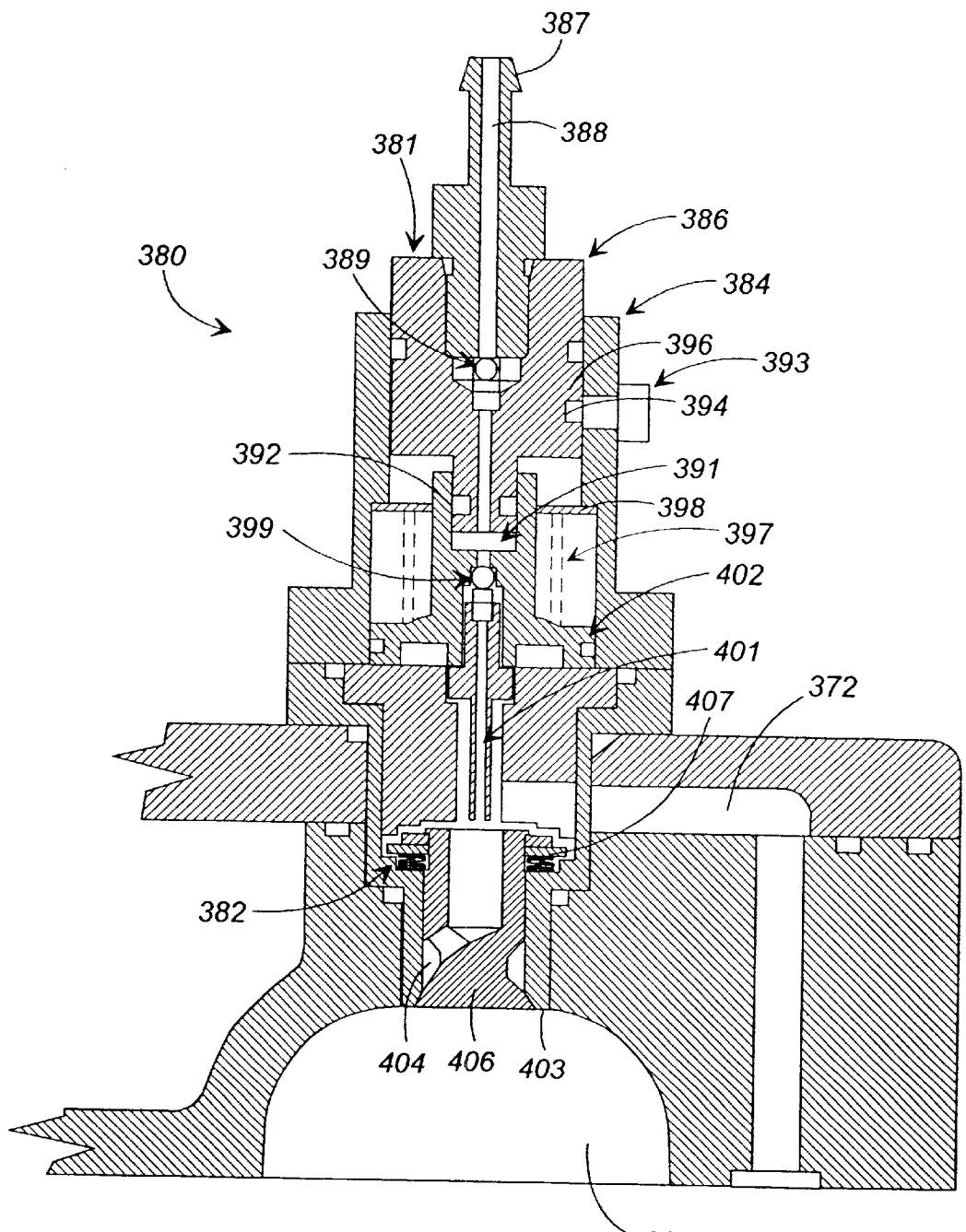
FIG. 10 is a cross sectional end view of the fuel metering system for the multi-fuel engine of FIGS. 8 and 9.

As shown in FIG. 10, a fuel metering chamber 391 is formed within the metering unit housing below the lower end 392 of the fuel piston 386. The size of the fuel metering chamber typically is set by the amount of travel of the fuel piston within the housing. This travel of the fuel piston is adjustable through the use of a metering body guide pin 393 that projects into the housing adjacent the upper end thereof and includes a distal end 394 that is received within a helical slot 396 formed in the fuel piston 386 as shown in FIG. 10. As the fuel piston is turned clockwise or counterclockwise, it is raised or lowered within the housing as the helical slot 396 engages guide pin 393, thus changing the stroke of the metering fuel piston and the metered pump volume. A piston spring is mounted to a flange or ring 398 surrounding the lower end of the fuel piston 392 and resets the fuel piston when the pressure drops at the end of a compression stroke to open the inlet check valve and enable fuel to flow through the passage and into the metering chamber 391.

An outlet check valve 399 is mounted within the fuel passage 388 below the fuel metering chamber 391 for controlling the flow of fuel under pressure into a fuel discharge 401. An air piston 402 is positioned within the housing and engages to the outlet check valve, biasing the outlet check valve closed until the fuel is forced from the metering chamber at a sufficiently high pressure from the fuel piston so as to overcome the air piston and cause the outlet check valve to open and allow the passage of fuel therethrough. The fuel thus is delivered at high pressures of approximately 400–600 psi or greater into the compressed air injection stream or flow through the fuel discharge 401 as indicated in FIG. 10. The high pressure fuel discharge readily mixes with the compressed air injected through the air injection passage so as to form a combustible mixture of fuel and air.

As shown in FIGS. 8–10, the fuel delivery valve 382 is positioned beneath the fuel discharge 401 of the fuel metering device 381 for receiving the combustible mixture of fuel and air therethrough. The fuel delivery valve 382 has a construction as discussed above, including a housing 403 in which a poppet or valve member 404 is received. The valve member is movable along the housing from a sealed, closed position as indicated in FIG. 10 into an open position to enable passage of the combustible mixture through the valve. A series of springs 407 are mounted between the housing and the valve member for biasing the valve member to a closed position as shown in FIG. 10.

Typically, the valve opening or cracking pressure required to overcome the force of the springs and move the valve member downwardly to an opened position is set at one atmosphere or greater. Thus, the combustible mixture of fuel and air generally is delivered to the fuel delivery valve at a pressure of at least one atmosphere to open the valve and enable passage of the combustible mixture therethrough. As a result, as discussed above, the droplets of fuel, including heavy fuel, are caused to be substantially atomized within the air of the combustible mixture so as to increase the surface area of the fuel exposed to air to enable the combustible mixture to readily form vapors within the combustion chamber as the combustible mixture is delivered into the chamber.

An ignition system 410 for each cylinder is mounted to the manifold at each cylinder and, as shown in FIGS. 8, 9 and 12, generally includes at least one igniter 411 such as the catalytic igniter discussed above with reference to FIGS. 5–7. Each igniter 411 includes an igniter body 412 having a nozzle end 413 that projects into the combustion chamber for its cylinder, and a rear end 414 that projects outwardly from the manifold or cylinder head. An igniter rod 416 extends along the interior of the igniter body and is supported at both ends thereof. An electrical connector 417 is attached to the rear end of the igniter rod and extends through the upper end of the igniter body for connection of the igniter to a current supply such as a 12 volt DC battery. A current of approximately 2.5 amps is supplied through the electrical contact and along the igniter rod through a catalyst material 418 applied in a desired pattern along the length of the rod. A heating zone 419 is formed from a concentration of the catalyst material at an intermediate point along the igniter rod adjacent the lower end thereof.

As shown in FIG. 8, the nozzle end 413 of the igniter 411 further includes a series of ports 421 that enable a portion of the combustible mixture to flow into the igniter body and thus into contact with the heating zone. As the combustible mixture comes into contact with the heating zone, it is ignited, creating a flare or plume of flame that exits through the ports of the nozzle and into the combustion chamber to cause the combustion of the remaining portion of the combustible mixture.

As shown in FIG. 9, multiple igniters, here shown as a pair of igniters, can be provided for each cylinder for system redundancy and insure complete ignition of the combustible mixture as needed. In addition, as illustrated in FIG. 11, it is also possible to use a conventional spark plug as indicated at 425 in place of the catalytic igniter illustrated in FIGS. 8, 9 and 12. Further, FIGS. 11 and 12 illustrate additional arrangements or positions for the fuel delivery system about the combustion chamber and main cylinder as needed for varying the configuration of the engine to suit a desired application.

Figure 13:
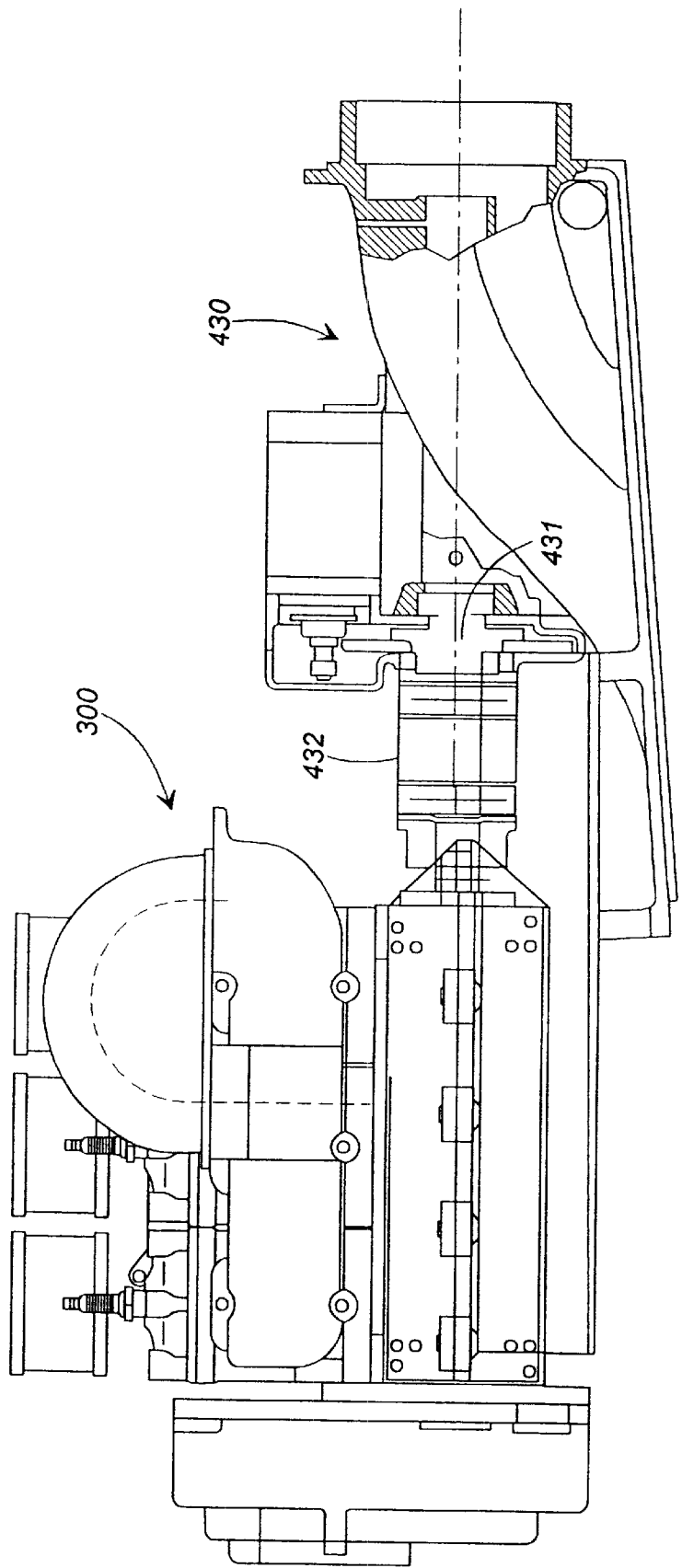
FIG. 13 is a side elevational view illustrating the mounting of the multi-fuel engine of FIGS. 8–12 to a water jet drive system.

The engine of the present embodiment provides a compact, light weight engine that is approximately 14 inches in height, approximately 20 inches in length and 15 inches in width and weighs approximately 85 lbs. for a shaft horsepower of approximately 60. In operation, the second embodiment 300 of the multi-fuel engine of the present invention typically will be used for driving small water craft and aircraft, such as for driving a Water Jet pump as illustrated in FIG. 13. The multi-fuel engine generally is connected to an impeller drive for the Water Jet, as indicated generally at 431 by a connector such as a bell housing indicated at 432.

Upon starting of the multi-fuel engine, one or more of the stepped pistons, such as 302 and 304 as shown in FIG. 9, are urged downwardly in the direction of arrow 361', causing rotation of the crankshaft 311. In response to the rotation of the crankshaft, at least one of the other stepped pistons, i.e., stepped piston 303, is urged upwardly in the direction of arrow 361 toward the combustion chamber. As the stepped piston 303 is moved along its upward stroke toward the combustion chamber, it creates a negative air pressure or vacuum within the main cylinder so as to cause air to be drawn through the check valve 336 of the engine air inlet 331 and into the cylinder and crankcase. At the same time, air within the stepped passage 367 of the cylinder is urged upwardly and along the stepped passage and into the air injection passage 372 by the step 354 of the stepped piston 350. This flow of air is compressed and forced along the air injection passage in the direction of arrows 376 and into the fuel metering device 381. At the same time, a set amount of fuel is dispensed by the fuel metering device under pressure of approximately 400 to 600 psi, or greater and is mixed with the compressed air from the air injection passage to form the combustible mixture.

The combustible mixture generally is delivered under pressures of approximately 1 atmosphere or greater to a fuel delivery valve 382 which dispenses the combustible mixture into the combustion chamber. As a result, the fuel droplets within the combustible mixture are substantially atomized into the air of the mixture, forming a fine mist of substantially atomized fuel and air that is received into the combustion chamber, and which is able to readily form fuel/air vapors. Such vapors pass into the ports of the nozzle of the igniter 411 and are ignited by contact with the heating zone 419 of catalyst material 418 formed on the igniter rod 416. Such ignition causes a flare or plume of flame to erupt through the ports of the nozzle and into the combustion chamber causing the combustion of the remaining combustible mixture.

The resulting explosion forces the stepped piston of that cylinder to be driven downwardly along the length of the cylinder in the direction of arrow 361', which in turn drives the crankshaft for the impeller of the water jet engine or similar application. The rotation of the crankshaft also causes the other stepped pistons to be urged along their upward stroke for continuing the cycle of operation.

As the stepped piston is driven downwardly, it compresses the air previously drawn into the crankcase through the engine air inlet, causing the air to be forced through transport passages (not shown) and into the main cylinder chamber through transfer ports 341. This ambient air forces the burnt gases and bi-products of combustion and gases out of the main cylinder and through the engine exhaust 342. As a result, the main cylinder is substantially scavenged or cleansed of such gases and bi-products of combustion without requiring a portion of the combustible mixture to be used to evacuate and exhaust the burnt gases and bi-products of combustion of the engine, which creates a waste of fuel.

In addition, as each stepped piston is moved downwardly along the length of its cylinder, air is drawn through the secondary air intake and into the stepped passage 367 either through the crankcase, as illustrated in FIG. 8, or through negative air pressure created in the stepped passage by the movement of the stepped piston therealong drawing air through the secondary air intake from the engine air inlet as illustrated in FIG. 11 and 12. This replenishes the air within the stepped passage for injection into the fuel metering module upon movement of the stepped piston through its upward stroke.

It will be understood by those skilled in the art that the principles of the present invention can be applied to engines having one or more cylinders and should not be restricted solely to one to three cylinder engines. In addition, by delivering the fuel and air mixture through the fuel delivery valve at a substantially sonic rate of flow, the fuel droplets within the combustible mixture are caused to be substantially atomized within the air of the combustible mixture. This enables the combustible mixture to readily form fuel/air vapors even with the use of heavy fuels to form the combustible mixture, which vapors are easily and readily ignited by exposure to the heated catalyst material of the igniter. As a result, the multi-fuel engine of the present invention can be small, constructed of relatively light weight for greater ease of portability and handling while allowing use of a variety of different types of fuels including gasoline and alcohol based fuels, and heavy fuels including diesel fuel, JP5, JP8, Jet-A and kerosene sacrificing or diminishing the power output of the engine as compared with comparable larger size heavy fuel engines.

It further will be understood by those skilled in the art that while the present invention has been disclosed with reference to preferred embodiments thereof, various modifications, changes and additions can be made thereto without departing from the spirit and scope of the present invention as set forth in the following claims.

What is claimed is:

1. An engine capable of being run on various types of fuels including heavy fuels being one of diesel fuel, JP5, Jet-A, JP8, kerosene, and gasoline and alcohol based, fuels, said engine comprising:

an engine block having at least one cylinder defining at least one cylinder chamber;

a cylinder head mounted on said cylinder and defining a combustion chamber;

at least one piston received within said at least one cylinder chamber and moveable therealong, said piston connected to a crankshaft for driving the crankshaft;

a fuel delivery system for delivering a combustible mixture of fuel and air to said combustion chamber with the combustible mixture being delivered at a sonic rate of flow so as to substantially atomize the fuel in the air for enhanced ignition; and at least one igniter mounted adjacent said combustion chamber and having an ignition zone at which the combustible mixture is ignited to cause combustion of the combustible mixture within said combustion chamber for driving said piston.

2. The engine according to claim 1, wherein said igniter comprises an igniter body having a first end and a second end, an igniter rod received within and extending along said igniter body and having a first end engaged and supported by an electrical connector at said first end of said body, a second end supported at said second end of said body, and a catalyst material applied along said igniter rod and through which a current is passed for heating said catalyst material to cause ignition of the combustible mixture.

3. The engine according to claim 2, wherein said igniter rod is formed from a dielectric material and said actalyst material includes platinum.

4. The engine according to claim 2, wherein said second end of said igniter body includes a seat in which said second end of said igniter rod is received and held and which contacts said, catalyst material to ground said catalyst material.

5. The engine according to claim 2, further including an insulator positioned at the first end of said igniter body, in which said electrical connector is mounted, and wherein said electrical connector includes contacts that releasibly engage and hold said first end of said igniter rot.

6. The engine according to claim 2, wherein said catalyst material is printed on a tape applied about said conductor rod and forms a heating zone at which said catalyst material is heated to a temperature that ignites the combustible mixture.

7. The engine according to claim 1, wherein said at least one piston comprises a stepped piston having a head portion, a skirt portion, a stepped portion at one end of said skirt portion, and a connecting rod connecting said piston to the crankshaft of the engine.

8. The engine according to claim 7, wherein said at least one cylinder comprises a main cylinder chamber and a stepped cylinder chamber communicating with a secondary air intake and an air injection passage for said fuel delivery system, wherein as said piston is moved along said cylinder chamber, air is drawn into said stepped chamber and thereafter is urged along said air injection passage to said fuel delivery system as movement of said piston is reversed.

9. The engine according to claim 8, wherein said fuel delivery system comprises a fuel delivery valve having an inlet end adjacent said air injection passage and a discharge end projecting into said combustion chamber, and wherein the engine further includes a fuel metering device positioned adjacent and communicating with said air injection passage for mixing fuel with the air from said air injection passage to form the combustible mixture of fuel and air delivered to said combustion chamber by said fuel delivery valve.

10. The engine according to claim 1, wherein said igniter comprises a spark plug.

11. The engine according to claim 1, further including a second and a third cylinder each defining at least one cylinder chamber in which a piston is received.

12. An engine according to claim 1, wherein said fuel delivery system includes a valve forming a combustible mixture passageway to deliver said combustible mixture to said combustion chamber.

13. An engine according to claim 12, wherein said valve includes a valve member which is movable to form said combustible mixture passageway.

14. An engine according to claim 13, wherein the valve includes a stop to limit movement of the valve member and thereby limit a cross-sectional area of a convergent passageway portion of the combustible mixture passageway.

15. The engine according to claim 14, wherein the convergent passage is circular.

16. An engine according to claim 12, wherein said combustible mixture passageway is formed upon the combustible mixture attaining a differential pressure to create a sonic velocity flow of the combustible mixture through said valve.

17. An engine according to claim 12, wherein the combustible mixture passageway includes a convergent passageway portion adjacent-the combustion chamber.

18. The engine according to claim 17, wherein the convergent passageway is circular.

19. A method of operating an engine capable of being run using a variety of different types of fuels including heavy fuels being one of JP5, JP8, Jet A, diesel fuel, and kerosene, and gasoline and alcohol based fuels, comprising:

drawing fuel and air into a fuel metering device to form a combustible mixture of fuel and air;

delivering the combustible mixture to a fuel delivery valve at a rate of flow sufficient to create an opening pressure differential sufficient to open the fuel delivery valve and cause the combustible mixture to flow through the fuel delivery valve at a sonic rate of flow such that the fuel of the combustible mixture is caused to be substantially atomized within the combustible mixture;

dispensing the combustible mixture into a combustion chamber of the engine;

igniting the combustible mixture with a heated igniter to cause combustion of the combustible mixture; and in response to the combustion of the combustible mixture, moving a piston in a reciprocating cycle along a cylinder of the engine to drive a crankshaft of the engine.

20. The method according to claim 19, wherein igniting the combustible mixture comprises heating a catalyst material within the igniter to a temperature that ignites the combustible mixture, and passing a portion of the combustible mixture into contact with the heated catalyst material to ignite the combustible mixture.

21. The method according to claim 19, wherein drawing fuel and air into a fuel metering device includes drawing air into a stepped chamber through a secondary air inlet as the piston is moved along a first stroke, and urging the air in the stepped chamber through an air injection passage and into the fuel metering device as fuel is drawn into the fuel metering device as the piston is moved along a return stroke.

22. A fuel deliver system for an engine having a combustion chamber and capable of running on different types of fuels including heavy fuels and alcohol based fuels, comprising:

a fuel metering device for delivering a supply of fuel for mixing with air to form a fuel/air mixture;

a fuel delivery valve for delivering the fuel/air mixture to the combustion chamber at a sonic rate of flow so as to substantially atomize the fuel in the air for ignition; and a compressor cylinder assembly positioned between the fuel metering device and said fuel delivery valve;

wherein the compressor cylinder assembly comprises a compressor cylinder, a piston movable along said compressor cylinder for drawing the fuel/air mixture into said compressor cylinder and directing the fuel/air mixture towards the fuel delivery valve at a sonic velocity so as to create an opening differential pressure sufficient to open the valve and enable passage of the fuel/air mixture therethrough at a sonic rate of flow.

23. A fuel delivery system for an engine according to claim 22, wherein the valve includes a stop to limit a cross-sectional area of a convergent passage into the valve.

24. A fuel delivery system for an engine according to claim 22, wherein the valve forms a convergent passage for the fuel/air mixture adjacent the combustion chamber.

25. An engine capable of being run on various types of fuels including heavy fuels being one of diesel fuel, JP5, Jet A, JP8, kerosene, and gasoline and alcohol based fuels, said engine comprising:

an engine block having at least one cylinder defining at least one cylinder chamber;

a cylinder head mounted on said cylinder and defining a combustion chamber;

at least one piston received within said at least one cylinder chamber and moveable therealong, said piston connected to a crankshaft for driving the crankshaft;

a fuel delivery system for delivering a combustible mixture of fuel and air to said combustion chamber with the combustible mixture being delivered at a sonic rate of flow so as to substantially atomize the fuel in the air for enhanced ignition; and at least one spark igniter mounted adjacent said combustion chamber and having an ignition zone at which the combustible mixture is ignited to cause combustion of the combustible mixture within said combustion chamber for driving said piston, wherein said fuel delivery system includes a fuel delivery valve including a valve body defining a valve passageway having an inlet end and an exit end defining a valve opening, a valve member received in said valve body and movable along said valve passageway, said valve member having an air passage formed therein and which communicates with the valve opening as said valve member is moved along said valve passageway between open and closed positions, and a bias for maintaining said valve member in the closed position until the combustible mixture is directed through said air passage at an opening differential pressure sufficient to overcome said bias and open said valve opening so as to create a sonic velocity flow of the combustible mixture through said fuel delivery valve.

26. The engine according to claim 25, wherein the spark igniter comprises a spark plug.

27. The engine according to claim 25, wherein said bias includes a series of spring washers engaging and urging said valve member toward the closed position.

28. The engine according to claim 27, wherein said fuel delivery valve further includes a retaining washer positioned adjacent said spring washers limiting movement of said valve member along said valve passageway and a retaining ring for securing said retainer washer and said spring washers to said valve body.

29. The engine according to claim 25, wherein said fuel delivery system includes a fuel metering device in which fuel is received for mixing with air to form the combustible mixture supplied to said fuel delivery valve.

30. The engine according to claim 29, wherein said fuel metering device comprises a fuel injector.

31. An engine capable of being run on various types of fuels including heavy fuels being one of diesel fuel, JP5, Jet A, JP8, kerosene, and gasoline and alcohol based fuels, said engine comprising:

an engine block having at least one cylinder defining at least one cylinder chamber;

a cylinder head mounted on said cylinder and defining a combustion chamber;

at least one piston received within said at least one cylinder chamber and moveable therealong, said piston connected to a crankshaft for driving the crankshaft;

a fuel delivery system for delivering a combustible mixture of fuel and air to said combustion chamber with the combustible mixture being delivered at a sonic rate of flow so as to substantially atomize the fuel in the air for enhanced ignition; and at least one spark igniter mounted adjacent said combustion chamber and having an ignition zone at which the combustible mixture is ignited to cause combustion of the combustible mixture within said combustion chamber for driving said piston, wherein said fuel delivery system further includes a fuel metering device for delivering a supply of fuel for mixing with air to form the combustible mixture, a fuel delivery valve for delivering the combustible mixture to said combustion chamber at a sonic rate of flow, and compressor cylinder assembly positioned between said fuel metering device and said fuel delivery valve and comprising a compressor cylinder, a piston movable along said compression cylinder for drawing the combustible mixture into said compressor cylinder and directing the combustible mixture toward said fuel delivery valve at a sonic velocity so as to create an opening differential pressure sufficient to open said valve and enable passage of the combustible mixture therethrough at a sonic rate of flow.

32. A method of operating an engine capable of being run using a variety of different types of fuels including heavy fuels being one of JP5, JP8, Jet A, diesel fuel, and kerosene, and gasoline and alcohol based fuels, comprising:

drawing fuel and air into a fuel metering device to form a combustible mixture of fuel and air;

delivering the combustible mixture to a fuel delivery valve at a rate of flow sufficient to create an opening pressure differential sufficient to open the fuel delivery valve and cause the combustible mixture to flow through the fuel delivery valve at a sonic rate of flow such that the fuel of the combustible mixture is caused to be substantially atomized within the combustible mixture;

dispensing the combustible mixture into a combustion chamber of the engine;

igniting the combustible mixture with a spark igniter to cause combustion of the combustible mixture; and in response to the combustion of the combustible mixture, moving a piston in a reciprocating cycle along a cylinder of the engine to drive a crankshaft of the engine, wherein delivering the combustible mixture comprises driving an auxiliary piston so as to draw the combustible mixture of air and fuel into an auxiliary cylinder, and urging the combustible mixture from the auxiliary cylinder and into the fuel delivery valve at a sonic velocity sufficient to open the fuel delivery valve and cause the fuel to be substantially atomized into the air of the combustible mixture.

* * * * *